United States Patent [19]
Fichou et al.

[11] Patent Number: 6,072,773
[45] Date of Patent: Jun. 6, 2000

[54] FLOW CONTROL FOR VERY BURSTY CONNECTIONS IN HIGH SPEED CELL SWITCHING NETWORKS

[75] Inventors: Aline Fichou, La Colle-sur-Loup; Pierre-Andre Foriel; Francois Kermarec, both of Cagnes-sur-mer; Laurent Nicolas, Villeneuve-Loubet, all of France

[73] Assignee: Cisco Systems, Inc., San Jose, Calif.

[21] Appl. No.: 08/898,057

[22] Filed: Jul. 22, 1997

[30] Foreign Application Priority Data

Dec. 24, 1996 [EP] European Pat. Off. ............. 96480129

[51] Int. Cl.$^7$ ...................................................... G08C 15/00
[52] U.S. Cl. ........................... 370/230; 370/235; 370/252
[58] Field of Search ................................. 370/230, 235, 370/229, 231, 232, 233, 234, 395, 252, 253

[56] References Cited

U.S. PATENT DOCUMENTS

| | | | |
|---|---|---|---|
| 5,434,848 | 7/1995 | Chimento, Jr. et al. | 370/232 |
| 5,533,020 | 7/1996 | Byrn et al. | 370/395 |
| 5,652,749 | 7/1997 | Davenport et al. | 370/466 |
| 5,790,546 | 8/1998 | Dobbins et al. | 370/400 |

*Primary Examiner*—Hassan Kizou
*Assistant Examiner*—Mitchell Slavitt
*Attorney, Agent, or Firm*—Cesari and McKenna, LLP

[57] ABSTRACT

In high speed cell switching networks, a Call Admission Control (CAC) procedure is performed on each connection according to a specified Traffic Descriptor. A mandatory parameter of the Traffic Descriptor is the Peak Cell Rate (PCR), associated with a Cell Delay Variation Tolerance (CDVT). Connections which specify a high CDVT value may potentially send into the network bursts of cells at a rate much higher than the declared Peak Cell Rate, which may lead to congestion in cell buffers of intermediate network nodes. Guaranteeing the Quality of Service (QoS) for such connections may require the reservation of a high amount of resources in the network, leading to poor utilization of those resources. A Call Admission Control procedure, associated with an Usage Parameter Control/Network Parameter Control mechanism, provides:

- accepting not bursty connections and guaranteeing the Quality of Service requested at connection setup,
- accepting very bursty connections and guaranteeing a minimal Quality of Service rather than simply rejecting them,
- protecting the network from potentially too bursty traffic,
- determining a bandwidth reservation method based on a Mean Burst Length,
- for every connection, minimizing the bandwidth reservation while satisfying the required Quality of Service.

16 Claims, 11 Drawing Sheets

FLOW CONTROL FOR VERY BURSTY CONNECTIONS IN HIGH SPEED CELL SWITCHING NETWORKS

BACKGROUND OF THE INVENTION

(1) Field of the Invention

The present application relates to flow control in high speed cell switching networks. More particularly, the invention relates to a method and system for reserving bandwidth for very bursty ATM connections according to (1) traffic parameters and tolerance values declared at call setup and (2) policing the traffic according to the Generic Cell Rate Algorithm (GCRA) associated with the bandwidth reservation.

(2) Background Information

Asynchronous Transfer Mode (ATM)

The "Broadband Integrated Services Digital Network" or B-ISDN is a new telecommunication technology developed by the telecommunications (carrier) industry for both the data transmissions (computer) and the telecommunications (telephone). This is conceived as a carrier service to provide high speed communications to end users in an integrated way. The technology selected to deliver the B-ISDN service is called "Asynchronous Transfer Mode" or ATM. The almost universal acceptance of ATM comes from the fact, that:

ATM handles all the different kinds of communication traffic, as voice, data, image, video, high quality sound, multimedia and many others, ATM can be used in both the LAN (Local Area Network) and the WAN (Wide Area Network) network environments and hence promises a seamless interworking between the two.

Thus ATM is effective in a much wider range of communications environments than any previous technology. It provides high bandwidth, low delay, fixed length cell based transfer mode technique (an ATM cell has a length of 53 bytes, 48 bytes for payload and 5 bytes as header), and allows multiplexing and switching of different types of traffic in an integrated way, while optimizing the network resources utilization.

The conceptual structure of an ATM network is shown in FIG. 1.

ATM Networks

FIG. 1 shows a typical ATM network composed by three quite separate networks—two private 101a and 101b and one public 102. Private ATM networks are sometimes called "Customer Premises Networks" and indeed they will very often be confined to a local area such as a building or a campus. However, a private ATM network can be distributed over a wide area by the use of non-ATM links between nodes. Such links could be copper-wire leased lines, "dark" fibers or Sonet/SDH TDM (Synchronous Optical Network/Synchronous Digital Hierarchy Time Division Multiplexing) connections.

VIRTUAL CONNECTIONS (VC) / VIRTUAL PATHS (VP)

In ATM networks, the end-to-end data traffic between a source and a destination is represented by a Virtual Connection (VC). A Virtual Path (VP) is a route through the network representing a group of Virtual Connections (VCs). In the present application, the generic term "connection" will be used indifferently (unless explicitly specified) for VC as well as for VP.

ATM END-POINT

The ATM end-point 100a, 100b is a piece of end user equipment that interfaces to an ATM network in a native way. An end-point sends and receives ATM cells on link connections defined by ATM standards. An end-point (and only an end-point) contains an ATM Adaptation Layer (AAL) function. An ATM end-point connects to the ATM network over the User Network Interface (UNI).

ATM SWITCHES

"ATM Switches" 103 are shown in FIG. 1. They are also more commonly called "Network Nodes". Anyway, a distinction must be made between "Transit Nodes" and "Access Nodes".

TRANSIT NODES: They perform the backbone data transport within the ATM network. Transit Nodes connected to a different ATM network must implement the Network Node Interface (NNI).

ACCESS NODES: They are Network Nodes located at the boundary of an ATM network where ATM end points are connected. Access Nodes implement the User Network Interface (UNI).

NETWORK NODE INTERFACE (NNI)

The NNI 107 is the interface between two Transit Nodes. NNI allows the connection of ATM switches belonging to different ATM networks. The NNI has in charge to implement the Network Parameter Control (NPC) 108, which monitors and takes actions on the traffic submitted by an ATM network to another ATM network.

USER NETWORK INTERFACE (UNI)

The UNI 105 is specified exactly by the applicable standards. They are two somewhat different UNIs called "public" and "private". The public UNI is for connection of end-user equipment to a public ATM network. The private UNI is for use within a single organisation's premises or for a private network using lines leased from a Telecom Operator.

The UNI has in charge to implement the Usage Parameter Control (UPC) function 106, which monitors and takes actions on the traffic submitted by ATM end-points to that ATM network. The UNI has also in charge to perform the Call Admission Control (CAC) 111 procedure, which determines whether or not a new connection can be established over the whole ATM network. The CAC procedure can have access for example to a Topology Database 110 to obtain all information related to the network resources (links load, number of connections already established, etc). If a connection must cross several networks to reach its destination, the CAC procedure is initiated in the UNI 105 of the first network 101a, but also performed in the NNI 107 of each network crossed 110, 101b.

LINKS (109)

There may be one or many physical link connections between the nodes. Links between nodes may be carried as "clear channel" such as over a direct point-to-point connection but may also be carried over an Sonet/SDH connection or over a PDH (Plesiochronous Digital Hierarchy) connection.

CELLS

The ATM network transports data (including voice and video) as 53 byte "cells". The objective is to provide a very short, constant, transit time through the network. Within the network there are no error recoveries (there is error detection for cell header information). Flow and congestion control is done not by the detailed interactive protocols of traditional data networks but by control on the rate of admission of traffic to the network (and a strong reliance on the statistical characteristics of the traffic). When network congestion is experienced there is no alternative cells must be discarded

ATM ADAPTATION LAYERS

End users of an ATM network are of two kinds:

Those that interface to the ATM network directly through either the public UNI or a private UNI.

Those that do not know anything about ATM and interface using a non-ATM protocol (such as Frame Relay, TCP/IP).

For all these types of users, common tasks must be performed in order to connect to the ATM network. ATM Adaptation Layer (AAL) is the real end-user interface to ATM that includes processing for these common tasks.

The present invention takes place in the Access Nodes (respectively, the Transit Nodes) implementing the UNI (respectively the NNI), and involves both the Call Admission Control (CAC) and the Usage Parameter Control (UPC) procedures (respectively the Network Parameter Control (NPC)). In a preferred embodiment, it is assumed that an ATM switch comprises one or more communication adapters to which are attached the physical links. Adapters are connected all together through a Switch Fabric which allows the traffic switching between any input adapter to any output adapter.

CONGESTION CONTROL IN ATM NETWORKS

QUALITY OF SERVICE OF ATM CONNECTIONS

Congestion control inside ATM networks is a critical matter as in any packet switching environment. Cells may be lost or unacceptable delays can be induced in case of traffic congestion. Depending on the type of traffic conveyed over the ATM network (voice, data, video), congestion can damage the Quality of Service (QoS) of traffic transmitted over connections:

For real-time traffic such as voice or video, cells can be lost but a delay in transmission is unacceptable. Real-time traffic has very stringent delay and jitter requirements.

When non real-time traffic (such as data) is transferred, a delay is acceptable but the cells cannot be lost.

In ATM networks, cells are short and no space is allocated in the header to enable error recovery for the payload. Error checking and recovery are applied on an end-to-end basis and congestion control is based on input rate regulation and bandwidth reservation at the network connection. A network connection requiring Networks can guarantee a Quality of Service (QoS) independently of the protocol used or of the network topology. Said Quality of Service (QoS) may be expressed, for instance in terms of:

Cell Loss Ratio (CLR) (the CLR expresses the likelihood that a cell will not reach its destination or not reach it by the time promised), End-to-end Cell Transfer Delay (CTD), End-to-end Cell Delay Variation (CDV, also called delay jitter),

. . .

In order to meet the required Quality of Service (QoS), network nodes have to control the traffic congestion both:

At connection admission time, and

Once the connection is established.

The amount of bandwidth reserved depends on the connection's traffic characteristics as well as the Quality of Service (QoS) requirements. The network keeps track of the available bandwidth on each link and uses this information to decide whether or not it can accommodate a new connection. Once a connection is set up, a congestion control mechanism ensures the user stays within its agreed-upon traffic characteristics. This congestion control is transparent as long as the user is in conformance, but may cause delay or packet loss if the user misbehaves. The purpose of this control is to ensure that the level of service given to other connections in the network is not degraded by a misbehaving user.

Accordingly, the problem to solve is the following:

Satisfying the QoS for connections which specify a high CDVT value may require the reservation of a high amount of bandwidth, leading to a poor utilization of network resources. The only alternative recommended by the ITU standard is to simply reject connections for which the CDVT value is greater than the bound $CDVT_{max}$.

For connections specifying a Sustainable Cell Rate, the associated Burst Tolerance defines a Maximum Burst Size for cells sent at the Peak Cell Rate. A bandwidth reservation strategy based on this maximal value may also reserve too much resources for satisfying the Quality of Service (QoS) associated with said connections.

SUMMARY OF THE INVENTION

An object of the invention is a high speed cell switching network minimizing bandwidth reservation for bursty and non bursty traffic and providing at least a minimal Quality of Service.

Another object is a high speed cell switching network including a call admission control procedure protecting the network from potetntially high bursty traffic.

Another object a call admission procedure which uses an usage parmeter control/network parameter control mechanism for determining a bandwidth reservation method based upon a mean burst length for a high speed cell network.

These and other objects, features and advantages are achieved in a plurality of access and transit nodes are interconnected with transmission links in a high speed cell switching network. An access node reserves bandwidth for very bursty traffic according to a connection specified quality of service, and polices the traffic according to traffic parameters and tolerance values declared at connection setup, the tolerance values including a Cell Delay Variation Tolerance (CDVT) value. The access node reserves bandwidth using the following steps:

determining a Cell Delay Variation Tolerance bound value (CDVT sub bound), reserving bandwidth in order to satisfy the specified quality of service if the declared Cell Delay Variation Tolerance (CDVT) value is less than or equal to the Cell Delay Variation Tolerance bound value ($CDVT_{bound}$)

reserving bandwidth and policing traffic in order to satisfy a quality of service based on new defined traffic parameters and tolerance values, if the declared Cell Delay Variation Tolerance (CDVT) value is greater than the Cell Delay Variation Tolerance bound value ($CDVT_{bound}$)

DESCRIPTION OF PREFERRED EMBODIMENT

Figure 1:
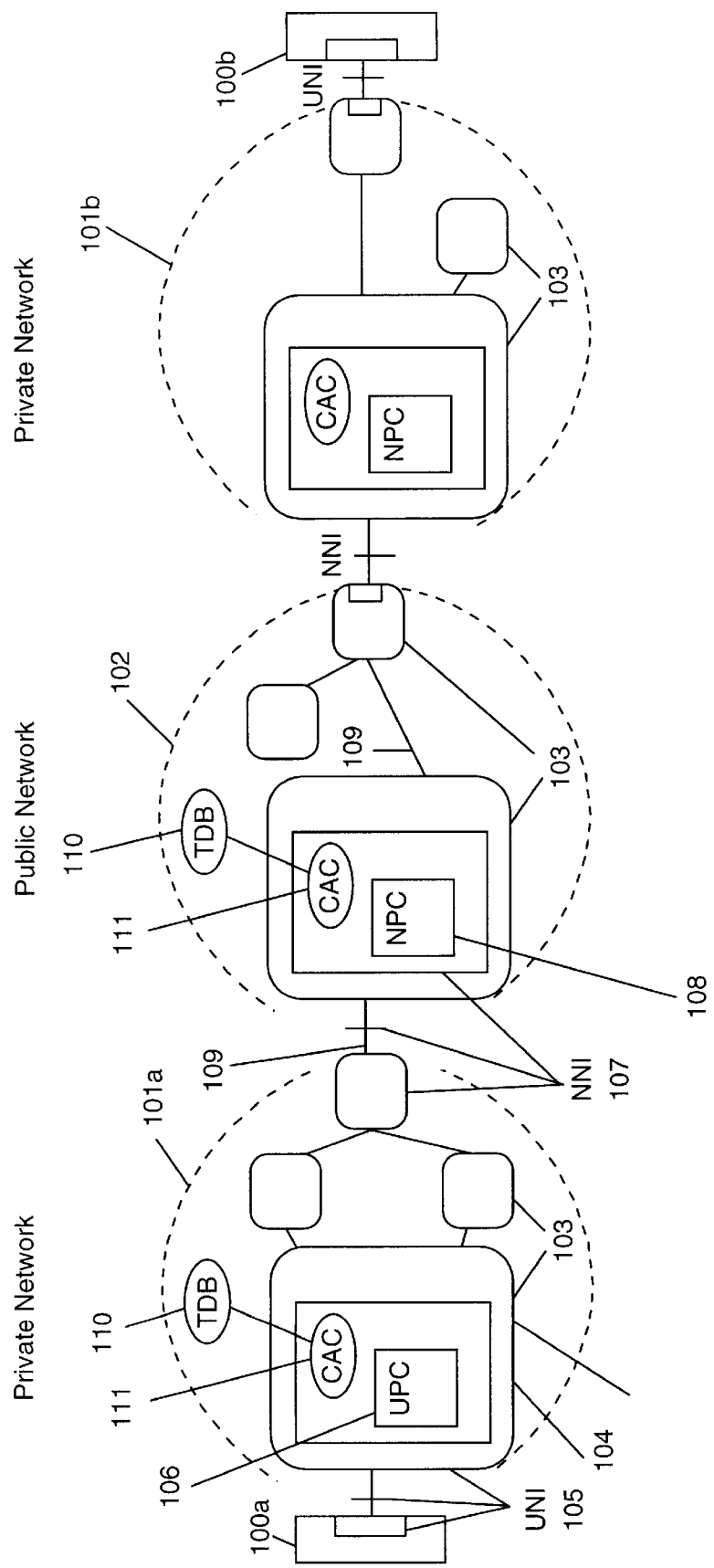
FIG. 1 shows the conceptual structure of a prior art ATM network.

The following factors are inspeeed in flow control in high speed cell switching networks and reserving bandwidth according to traffic parameters and tolerance values declared at call set up including policing the traffic according to a Generic Cell Rate Algorithm (GCRA) associated with the bandwidth reservation:

Call Admission Control (CAC) Procedure

Traffic Parameters Definition

In ATM networks, the bandwidth is allocated dynamically as part of a connection setup signalling procedure that precedes end-to-end information exchange. At connection admission time, the source (referred to as an ATM end-point identifier) provides, in addition to the destination (referred to as another ATM end-point identifier), a set of parameters, called "Traffic Descriptor" (TD), which attempts to describe the traffic that will be generated onto the links by the source.

PEAK CELL RATE (PCR) in cells/second

The Peak Cell Rate (PCR) is a mandatory descriptor of the connection. The Peak Cell Rate is the maximum rate at which a user can submit cells to the network. This is generally a value much lower than the Access Rate, where the Access Rate is the speed of the physical link connecting the user to the ATM network.

CELL DELAY VARIATION TOLERANCE (CDVT) in seconds

The Cell Delay Variation Tolerance (CDVT) defines the tolerance to take into account in the measurement of the Peak Cell Rate (PCR). The Cell Delay Variation Tolerance (CDVT) is characteristic of the jitter that may be induced on a periodic cell flow in Customer Premises Network (CPN)— due to multiplexing, insertion of cells on a slotted medium, etc.,—and measured at the network interface (either UNI or NNI). If these parameters (i.e, PCR and CDVT) are sufficient to fully describe Constant Bit Rate (CBR) connections (i.e., periodic stream of cells such as uncompressed voice), additional parameters are necessary to describe Variable Bit Rate (VBR) connections (such as connections for video traffic).

SUSTAINABLE CELL RATE (SCR) in cells/second

The Sustainable Cell Rate (SCR) defines a mean cell rate. This parameter is strongly associated with another parameter called Burst Tolerance (BT).

BURST TOLERANCE (BT) in seconds

The Burst Tolerance (BT) defines the maximal duration allowed for a traffic at Peak Cell Rate. The couple Sustainable Cell Rate (SCR) and Burst Tolerance (BT) defines the Maximal Burst Size (MBS), i.e, the maximal number of cells that may be received at Peak Cell Rate (PCR) (the relationship between SCR, BT and MBS will be detailed later in the description).

Discard Eligibility (Violation Tagging)

In addition to traffic parameters previously described, ATM allows an end user to differentiate the global traffic associated with a connection and to distinguish between a "high priority traffic" and a "low priority traffic". This can be done by using the Cell Loss Priority (CLP) bit in the header of every ATM cell. When set to 1 this bit indicates that the cell is low priority. That is, if the network needs to discard cells to relieve congestion then this cell should be discarded first. "Low priority traffic" (corresponding to a Cell Loss Priority bit equal to one CLP=1) may potentially be discarded at UPC/NPC (Usage Parameter Control/Network Parameter Control) level or in intermediate transit nodes in case of congestion. Optionally, the UPC/NPC has also the ability to convert ("to tag") "high priority traffic" (corresponding to a Cell Loss Priority bit equal to zero : CLP=0) into "low priority traffic" rather than simply discarding cells.

Traffic Descriptors Declaration

Standards have defined six ways to declare traffic parameters, i.e, six Traffic Descriptors, for an ATM connection (for more clarity, the Traffic Descriptors have been renumbered TD1 to TD6 in the present application):

1. TD1 : PCR(0+1), CDVT(0+1)

The Peak Cell Rate (PCR) value is specified for all the traffic sent by the source, i.e, the aggregation of the "high priority traffic" (CLP=0) and the "low priority traffic" (CLP=1).

The Cell Delay Variation Tolerance (CDVT) parameter associated with this Peak Cell Rate (PCR) value is also defined for the aggregate traffic.

Traffic (for which CLP=0 or 1) sent by the source with a Peak Cell Rate above PCR(0+1)—in accordance with the tolerance CDVT(0+1)—can be discarded at UPC/NPC level.

2. TD2 : PCR(0+1), CDVT(0+1)+PCR(0), CDVT(0)

A first Peak Cell Rate (PCR) value is specified for all the traffic sent by the source, i.e, the aggregation of the "high priority traffic" (CLP=0) and the "low priority traffic" (CLP=1) The Cell Delay Variation Tolerance (CDVT) parameter associated with this Peak Cell Rate (PCR) value is also defined for the aggregate traffic.

Another Peak Cell Rate (PCR) value is specified for only the "high priority traffic" (CLP=0) sent by the source. A Cell Delay Variation Tolerance (CDVT) parameter associated with this Peak Cell Rate (PCR) value is also defined for this "high priority traffic".

Traffic (for which CLP=0 or 1) sent by the source with a Peak Cell Rate above PCR(0+1)—in accordance with the tolerance CDVT(0+1)—can be discarded at UPC/NPC level. Moreover, high priority traffic (for which CLP=0 only) sent by the source with a Peak Cell Rate above PCR(0)—in accordance with the tolerance CDVT(0)—can also be discarded at UPC/NPC level.

3. TD3: PCR(0+1), CDVT(0+1)+PCR(0), CDVT(0)+ TAGGING

TD3 is the same as TD2, except that high priority traffic (for which CLP=0 only) sent by the source with a Peak Cell Rate above PCR(0)—in accordance with the tolerance CDVT(0)—must not be discarded at UPC/NPC level, but converted ("tagged") into "low priority traffic" (with CLP=1).

4. TD4: PCR(0+1), CDVT(0+1)+SCR(0), BT(0)

A Peak Cell Rate (PCR) value is specified for all the traffic sent by the source, i.e, the aggregation of the "high priority traffic" (CLP=0) and the "low priority traffic" (CLP=1).

The Cell Delay Variation Tolerance (CDVT) parameter associated with this Peak Cell Rate (PCR) value is also defined for the aggregate traffic.

A Sustainable Cell Rate (SCR) value is specified for only the "high priority traffic" (CLP=0) sent by the source. The Burst Tolerance (BT) parameter associated with this Sustainable Cell Rate value is also defined for this "high priority traffic".

Traffic (for which CLP=0 or 1) sent by the source with a Peak Cell Rate above PCR(0+1)—in accordance with the tolerance CDVT(0+1)—can be discarded at UPC/NPC level. High priority traffic (for which CLP=0 only) sent by the source with a Sustainable Cell Rate above SCR(0)—in accordance with the tolerance BT(0)—can also be discarded at UPC/NPC level.

5. TD5: PCR(0+1), CDVT(0+1)+SCR(0), BT(0)+ TAGGING

Same than TD4, except that high priority traffic (for which CLP=0 only) sent by the source with a Sustainable Cell Rate above SCR(0)—in accordance with the Burst Tolerance BT(0)— must not be discarded at UPC/NPC level, but converted ("tagged") into "low priority traffic" (with CLP=1).

6. TD6: PCR(0+1) CDVT(0+1)+SCR(0+1) BT(0+1)

A Peak Cell Rate (PCR) value is specified for all the traffic sent by the source, i.e, the aggregation of the "high priority traffic" (CLP=0) and the "low priority traffic" (CLP=1).

The Cell Delay Variation Tolerance (CDVT) parameter associated with this Peak Cell Rate (PCR) value is also defined for the aggregate traffic.

A Sustainable Cell Rate (SCR) value is also specified for all the traffic sent by the source, i.e, the aggregation of the "high priority traffic" (CLP=0) and the "low priority traffic" (CLP=1).

The Burst Tolerance (BT) parameter associated with this Sustainable Cell Rate (SCR) value is also defined for the whole traffic.

Traffic (for which CLP=0 or 1) sent by the source with a Peak Cell Rate above PCR(0+1)—in accordance with the tolerance CDVT(0+1)—can be discarded at UPC/NPC level. Traffic (for which CLP=0 or 1) sent by the source with a Sustainable Cell Rate above SCR(0+1)—in accordance with the Burst Tolerance BT(0+1)—can also be discarded at UPC/NPC level.

In the present description, suffixes (0+1) or (0) associated with traffic parameters will be omitted when said parameters indifferently refer to (0+1) or (0) cell flows.

Resources Reservation

At connection admission time the access node decides if it can accept the connection or not: This is the Call Admission Control (CAC) procedure. The decision to admit a new connection is based on:

The actual load of the links (obtained for example by having access to the Topology Database); and The previously described traffic parameters of the connection.

It is important to note that the decision to accept a new call is taken not only when the Call Admission Control (CAC) estimates that the Quality of Service (QoS) for the connection will be met, but also when it is sure that the additional traffic will not have a significant impact on the Quality of Service (QoS) of all the connections already established. In other words, resources (expressed in terms of bandwidth, buffer requirements . . . ) must be dedicated to said new connection in order both to:

Satisfy the user Quality of Service (QoS) requirements, and

Guarantee the Quality of Service (QoS) of all pre-established connections.

The amount of resources to reserve is function of both the traffic parameters associated with the connection, the network characteristics (link speeds, buffer sizes in transit nodes, etc.), as well as the current state of the network (links load, number of connections already established on every link, etc). Moreover, another objective of such a function should be not to overestimate the resources to be allocated to a connection, in order to optimize the network resources utilization. By "optimize", it is meant that resources allocated to a connection is minimum in regard with the specified Quality of Service (QoS) by the connection:

If less resources are allocated, the connection Quality of Service (QoS) will not be met.

If more resources are allocated, some of them will be globally unused during the whole life of the connection, wasting resources that could be used by other connections.

Equivalent Capacity

Many functions solving the bandwidth reservation problem can be found in the literature. In particular, this invention makes use of a method named "Equivalent Capacity", described in Ahmadi et al., U.S. Pat. No. 5,289,462, entitled "Traffic Management in Packet Communication Networks". However, the invention could make use of any other function that meet the same objectives.

The definition and the computation of the Equivalent Capacity according to Ahmadi et al. combines two characteristics of the traffic of the network:

The bandwidth needed by a single network connection in isolation, as a function of its characteristics, system resources, and desired QoS.

The impact of statistical multiplexing when many network connections, possibly with different characteristics are aggregated.

Let $R_i, m_i$ and $b_i$ respectively the Peak Rate, the Mean Rate and the Mean Burst Duration of a network connection i. Let x be the amount of buffer space available and $\alpha = \ln(1/\epsilon)$ where $\epsilon$ is the desired buffer overflow probability. The Equivalent Capacity $\hat{c}_i$ associated with connection i is given by:

$$\hat{c} = R_i \frac{Y_i - x + \sqrt{[y_i - x]^2 + 4x\rho_i y_i}}{2y_i}$$

where:

$$y_i = \alpha b_i (1 - \rho_i) R_i,$$

$$-\rho_i = m_i / R_i$$

In case of a Constant Bit Rate (CBR) connection, $\rho_i = 1$ and $b_i = \infty c_i = R_i$ for Constant Bit Rate (CBR) connections.

The equivalent capacity of Constant Bit Rate (CBR) connections is, however, not computed from equation ĉ$_i$ but directly taken equal to the Peak Rate of the connection.

Path Selection

The access node determines the best way to allocate resources to connections both to guarantee that user Quality of Service requirements are satisfied and also to optimize the overall throughput of the network. The Path Selection process within the access node must supply to the requesting user a path over the network over which a point-to-point connection will be established, and some bandwidth reserved if needed. The process uses as input parameters in one hand the Quality of Service requirements and on the other hand the status of the network links and nodes as maintained in the Topology Database. Each link of the path must have enough bandwidth available to accept the new connection. If no path is found, the connection is rejected.

Traffic Policing

Once the connection is established, a policing function in the ATM node implementing the User Network Interface (UNI) (respectively the Network Node Interface (NNI)) controls the user traffic (respectively, the network traffic), and detects traffic in excess according to the amount of resources reserved at connection setup.

- On one hand, the policing algorithm must be transparent as long as the traffic is consistent with the characteristics provided by the source at connection setup time.
- On the other hand, the policing algorithm must discard or tag (i.e, convert the high priority traffic—CLP=0—into low priority traffic—CLP=1—) user cell s that are in excess according to the traffic and tolerance parameters provided at connection setup.

Generic Cell Rate Algorithm (GCRA)

Although no policing mechanism has explicitly been standardized, a specific mechanism, namely the Generic Cell Rate Algorithm (GCRA), described in ITU-T Recommendation I.371, Traffic Management in Broadband ISDN Networks, Geneva, 3/93, and in ATM Forum Traffic Management Specification, Version 4.0, 4/96 can be used as reference. This mechanism monitors the traffic received at the UNI/NNI and takes discarding/tagging actions on the cells, according to a specified cell rate parameter and a tolerance value (for instance the Peak Cell rate (PCR) and the Cell Delay Variation Tolerance (CDVT)).

The Generic Cell Rate Algorithm (GCRA) is initialized at connection setup with a theoretical period T (seconds/cell) corresponding to the inverse of the cell rate parameter (T is the period of time between two successive cells of a cell flow) and a tolerance value associated with this period. Basically, traffic conforms to the Generic Cell Rate Algorithm GCRA(T,τ) if the time elapsed between the arrival of two consecutive cells (belonging to the same connection) is greater than or equal to T —(even if T−τ<0). If not, the traffic does not conform to the GCRA and cells are tagged or discarded.

When:
- A Peak Cell Rate PCR(0) and a Cell Delay Variation Tolerance CDVT(0); or
- A Sustainable Cell rate SCR(0) and a Burst Tolerance BT(0); or
- A Sustainable Cell Rate SCR(0+1) and a Burst Tolerance BT(0+1);

are also specified, a second Generic Cell Rate Algorithm (GCRA) is used in tandem with the first GCRA based on PCR(0+1) and CDVT(0+1), in order to control if the traffic conforms to PCR(0), SCR(0), or SCR(0+1) respectively.

GCRA Initialization According to Traffic Descriptors

Figure 2:
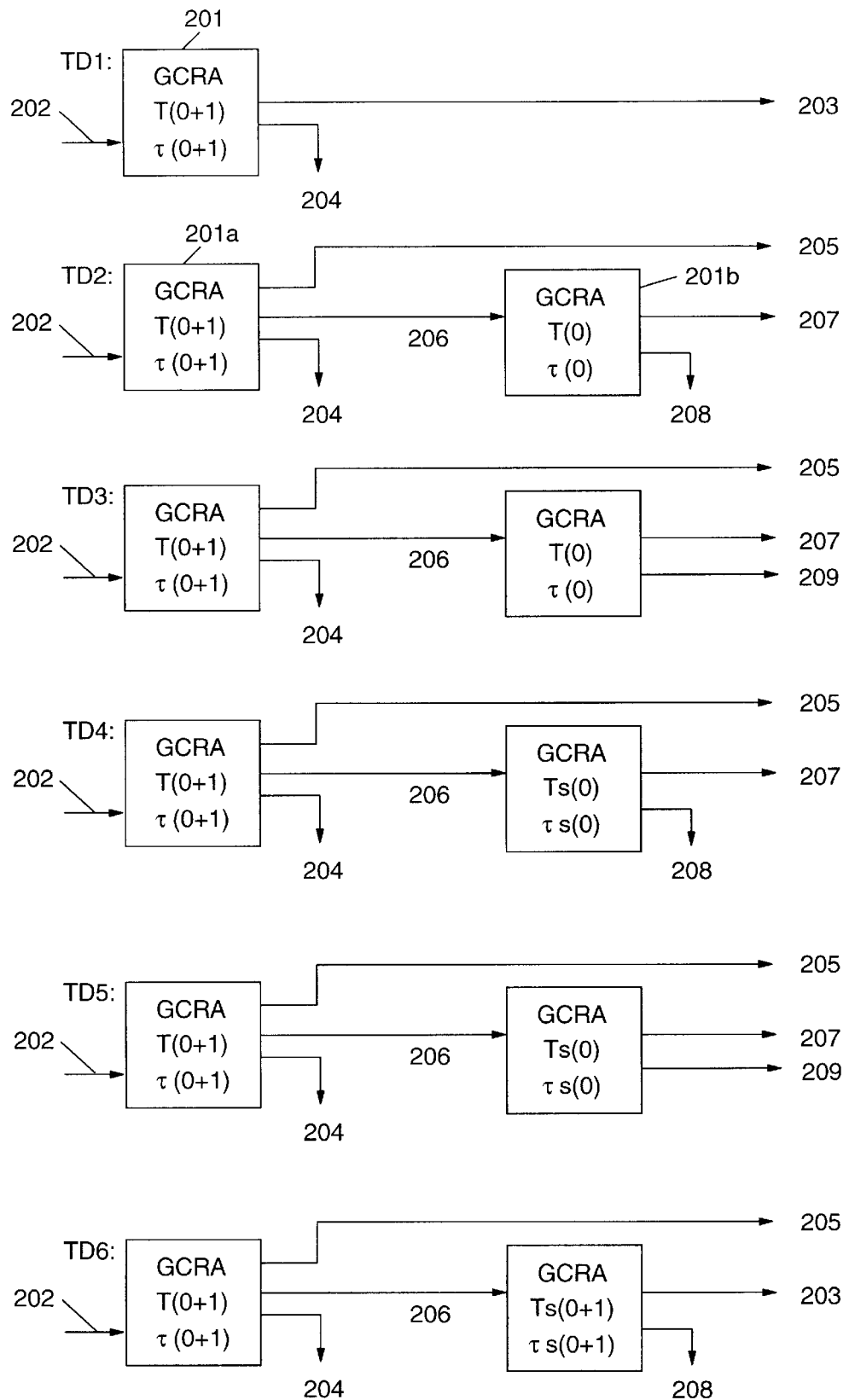
FIG. 2 shows the policing mechanism based on traffic descriptors according to prior art.

The correspondence between Traffic Descriptors and the policing mechanism is detailed in FIG. 2. The following notation is used:

T(0+1) is the theoretical period of the aggregate traffic (high and low priority traffic, i.e, CLP=0 and CLP=1) sent $$T(0+1) = \frac{1}{PCR(0+1)}$$

T(0+1) is the Cell Delay Variation Tolerance (CDVT) parameter associated with T(0+1), i.e, τ(0+1)=CDVT(0+1), T(0) is the theoretical period of the high priority traffic (with CLP=0) sent at Peak Cell Rate (PCR), i.e, $$T(0) = \frac{1}{PCR(0)}$$

τ(0) is the Cell Delay Variation Tolerance (CDVT) parameter associated with T(0), i.e, τ(0)=CDVT(0), T$_s$(0+1) is the theoretical period of the aggregate traffic (CLP=0 and CLP=1) sent at SCR, i.e, $$T_S(0) = \frac{1}{SCR(0)}$$

T$_s$(0+1) is the Burst Tolerance (BT) parameter associated to τ$_s$(0+1), i.e, τ$_s$(0+1)=BT(0+1), τ$_s$(0) is the theoretical period of high priority traffic (with CLP=0) sent at SCR, i.e, $$T_s(0) = \frac{1}{SCR(0)}$$

τ$_s$ is the Burst Tolerance (BT) parameter associated with T$_s$(0), i.e, τ$_s$(0)=BT(0)

1. TD1

The GCRA (201) is initialized with T(0+1), τ(0+1). All the traffic (the high and low priority traffic, i.e, with CLP=0 and CLP=1) sent by the source 202 is controlled by the GCRA:

Traffic which conforms to Generic Cell Rate Algorithm GCRA(T(0+1), τ(0+1)) is transmitted directly to the network 203.

Traffic which does not conform to the GCRA (exceeding the Peak Cell Rate PCR(0+1)) is discarded 204.

2. TD2

The first Generic Cell Rate Algorithm (GCRA) 201a is initialized with T(0+1), τ(0+1). The second GCRA 201b is initialized with T(0), τ(0).

The aggregate traffic (the high and low priority traffic, i.e, with CLP=0 and CLP=1) sent by the source 202 is processed by the first GCRA 201a:

Low priority traffic (with CLP=1) which conforms to GCRA(T(0+1), τ(0+1)) is transmitted directly to the network 205.

High priority traffic (with CLP=0) which conforms to GCRA(T(0+1), τ(0+1)) (206) is processed by the second GCRA 201b.

Traffic which does not conform to the GCRA (exceeding the Peak Cell Rate PCR(0+1)) is discarded 204.

At Second GCRA
  Traffic which conforms to GCRA(T(0), τ(0)) is transmitted directly to the network.
  Traffic which does not conform to the GCRA (exceeding the Peak Cell rate PCR(0)) is discarded 208.
3. TD3
  The first Generic Cell Rate Algorithm GCRA 201*a* is initialized with T(0+1), τ(0+1). The second GCRA 201*b* is initialized with T(0), τ(0). The aggregate traffic (both high and low priority traffic, i.e, with CLP=0 and CLP=1) sent by the source 202 is processed by the first GCRA 201*a*:
  Low priority traffic (with CLP=1) which conforms to GCRA(T(0+1), τ(0+1)) is transmitted directly to the network 205.
  High priority traffic (with CLP=0) which conforms to GCRA(T(0+1), τ(0+1)) 206 is transmitted to the second GCRA 201*b*.
  Traffic which does not conform to the GCRA (exceeding the Peak Cell Rate PCR(0+1)) is discarded 204.
At Second GCRA
  Traffic which conforms to GCRA(T(0), τ(0)) is transmitted to the network 207.
  Traffic which does not conforms to the GCRA (exceeding the Peak Cell Rate PCR(0)) is converted into low priority traffic (with CLP=1) and is transmitted to the network 209.
4. TD4
  The first GCRA 201*a* is initialized with T(0+1), τ(0+1). The second GCRA 201*b* is initialized with $T_s(0)$, $\tau_s(0)$. All the traffic (the high and low priority traffic, i.e, with CLP=0 and CLP=1) sent by the source 202 is processed by the first GCRA 201*a*:
  Low priority traffic (with CLP=1) which conforms to GCRA(T(0+1), τ(0+1)) is transmitted directly to the network 205.
  High priority traffic (with CLP=0) which conforms to GCRA(T(0+1), τ(0+1)) 206 is processed by the second GCRA 201*b*.
  Traffic which does not conforms to the GCRA (exceeding the Peak Cell rate PCR(0+1)) is discarded 204.
At Second GCRA
  Traffic which conforms to GCRA ($T_s(0)$, $\tau_s(0)$) is transmitted to the network 207.
  Traffic which does not conforms to the GCRA (exceeding the Sustainable Cell Rate SCR(0)) is discarded 208.
5. TD5
  The first GCRA 201*a* is initialized with T(0+1), τ(0+1). The second GCRA (201*b*) is initialized with $T_s(0)$, $\tau_s(0)$. All the traffic (the high and low priority traffic, i.e., with CLP=0 and CLP=1) sent by the source 202 is processed by the first GCRA 201*a*:
  Low priority traffic (with CLP=1) which conforms to GCRA(T(0+1), τ(0+1)) is transmitted directly to the network 205.
  High priority traffic (with CLP=0) which conforms to GCRA(T(0+1), τ(0+1)) 206 is processed by the second GCRA 201*b*.
  Traffic which does not conform to the GCRA (exceeding the Peak Cell Rate PCR(0+1)) is discarded 204.
At Second GCRA
  Traffic which conforms to GCRA($T_s(0)$, $\tau_s(0)$) is transmitted to the network 207.
  Traffic which does not conform to the GCRA (exceeding the Sustainable Cell Rate SCR(0)) is converted into low priority traffic (with CLP=1) and is transmitted to the network 209.

6. TD6
  The first GCRA 201*a* is initialized with T(0+1), τ(0+1). The second GCRA 201*b* is initialized with $T_s(0+1)$, $\tau_s(0+1)$. The aggregate traffic (the high and low priority traffic i.e, with CLP=0 and CLP=1) sent by the source 202 is processed by the first GCRA 201*a*:
  Low priority traffic (with CLP=1) and High priority traffic with CLP=0) which conforms to GCRA(T(0+1), τ(0+1)) 206 is processed by the second GCRA 201*b*.
  Traffic which does not conform to the GCRA (exceeding the Peak Cell Rate PCR(0+1)) is discarded 204.
At Second GCRA
  Traffic which conforms to GCRA($T_s(0+1)$, $\tau_s(0+1)$) is transmitted to the network 203,
  Traffic which does not conform to the GCRA (exceeding the Sustainable Cell Rate SCR(0+1)) is discarded 208.

Tolerance on Specified Traffic Parameters

A policing mechanism takes no repressive actions (discard, tag) on the traffic as long as it estimates that the traffic source complies with the parameters negotiated at connection setup. In particular, the policer uses the Cell Delay Variation Tolerance (CDVT) value to take into account the distortion (well known as Cell Delay Variation (CDV) or jitter) due to the queuing of the cells at each intermediate network node and more generally to the multiplexing of the cells on the output lines. The magnitude of this distortion depends on many parameters: The connection Peak Cell Rate, the Peak Cell Rate of the other connections that share the same links, the links load, the number of nodes along the path etc . . . The more cells travel through the network, the more the Cell Delay Variation is important. Especially, the instantaneous Peak Cell Rate (PCR) can be modified and can exceed the value PCR declared at connection establishment time. This results in the emergence of "bursts" of cells at a rate that may be far above the specified Peak Cell Rate (PCR). Assuming that the Link Access Rate is much higher than the Peak Cell Rate, the worst case is when the Cell Delay Variation Tolerance (CDVT) is large enough to allow a sequence of cells to transparently pass the GCRA (T,τ) and to enter into the network at the Link Access Rate. It should be noted that the specification of a large CDVT may be the consequence of:

Either a high distortion in the Customer Premises Network (CPN), or
  An inherently bursty traffic (such as IP—Internet Protocol—traffic).

When the Sustainable Cell Rate is also specified, the Burst Tolerance (BT) parameter defines the maximum number of cells (Maximum Burst Size (MBS)) that can be received at Peak Cell Rate (PCR). This Maximum Burst Size (MBS) parameter is simply derived from the expression:

$$MBS = Int\left[1 + \frac{BT}{(TS - T)}\right] \text{ where:}$$

*Int [x] is equal to "The nearest integer not greater than x", $$*T = \frac{1}{PCR}$$

$$* T_s = \frac{1}{SCR}$$

ATM Forum standard recommends to use, in the second GCRA (GCRA which monitors the Sustainable Cell Rate (SCR)), a tolerance value equal to:

BT+CDVT

The first term BT of the sum relates to the control of the Sustainable Cell Rate (SCR). The second term CDVT is added to take into account the incertitude on the Peak Cell Rate measurement. Without this term, cells declared conform to the first GCRA may be erroneously discarded by the second GCRA.

Figure 3:
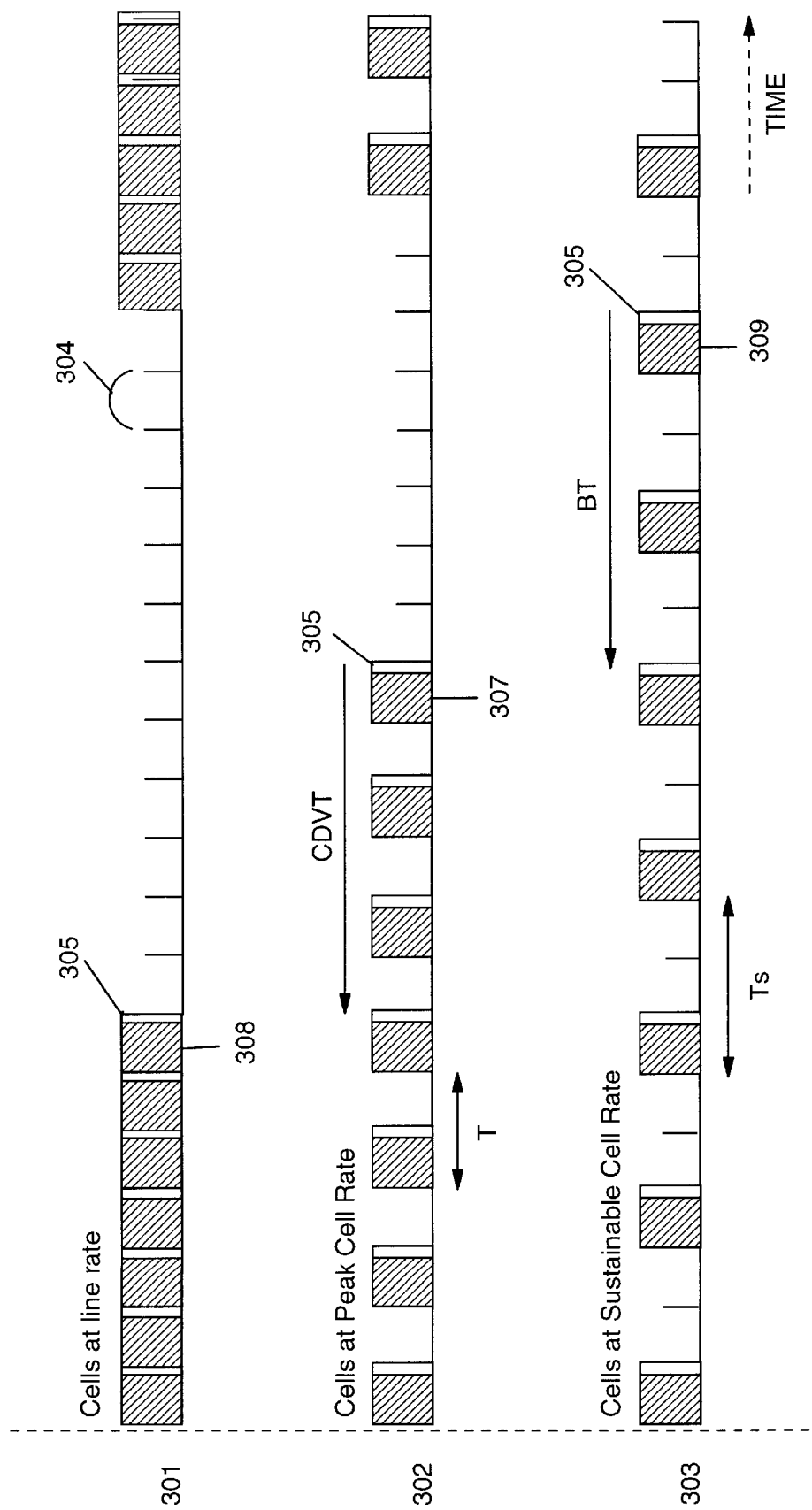
FIG. 3 shows three examples of traffic which conforms to a same policing mechanism according to prior art.

FIG. 3 shows three examples of traffic 301, 302, and 303 which conform to the definition of the policing mechanism GCRA(T, τ)+GCRA (T$_s$, τ$_s$). The X axis represents a period of time equally divided in "slots". The duration of a slot 304 is defined as the time needed to send an ATM cell at the link rate (i.e, (53×8)/L seconds, where L is the link rate expressed in bits/second). Let take the example of particular cell 305 (all cell flows start at slot 306):

- In cell flow 302, according to the definition of the Peak Cell Rate (PCR), cell 305 should arrive in slot 307.
- In cell flow 303, according to the definition of the Sustainable Cell Rate (SCR), cell 305 should arrive in slot 309.
- In cell flow 301:
    - Because of the Cell Delay Variation (CDVT), the GCRA(T,τ) (with T=1/PCR and τ=CDVT) accepts cell 305 even if it arrives in slot 308. Then traffic 301 conforms to GCRA(T,τ).
    - Because of the tolerance CDVT+BT, the GCRA(T$_s$, τ+τ$_s$) (with T =1/PCR, τ=CDVT, τ$_s$=BT) accepts cell 305 even if it arrives in slot 308.

In conclusion, all the traffics described above (the traffic made up of bursts of cells at link rate 301 or the traffic of equally spaced cells at Sustainable Cell Rate 303) are satisfying the same GCRA definition.

Flow Control for Bursty Connections

It has been widely proven in the literature that bursty traffic can have a significant impact on network resources management. Bursts can induce severe congestion of buffers in switching nodes and then can lead to an important degradation of the global Quality of Service (QoS). Resources allocation functions are mainly based on traffic parameters which do not integrate any tolerance parameter. As shown in FIG. 3, traffics having same cell rate parameters and associated tolerance may have radically different aspects.

Some resources allocation functions, such as the "Equivalent Capacity " (ĉ), compute a bandwidth (reserved along the path of the connection) which is function of a Peak Rate (R), a Mean Rate (m), and an information concerning the "burstiness" (for example the Mean Burst Length (b), the average duration for which a user submits data to the access node at the Peak Rate). The Equivalent Capacity is bounded by two values: The Mean Rate (m) and the Peak Rate (R).

The difference between the Equivalent Capacity and the Mean Rate (ĉ−m) is the fraction of bandwidth mandatory to ensure the Quality of Service (QoS) due to burstiness effect. The reservation of the Equivalent Capacity ĉ along the connection path ensures a loss probability in intermediate transit nodes, less than a predefined value ε(e.g, $10^{-8}$).

The difference between the Peak Rate and the Equivalent Capacity (R−ĉ) is the fraction of bandwidth which is saved, versus a reservation based on the Peak Rate (R). This saving contributes to optimize the utilization of network resources.

If the Peak Rate (R) is modified by a large Cell Delay Variation Tolerance (CDVT), the Quality of Service (QoS) provided by the computation of the Equivalent Capacity" is no longer guaranteed. A higher rate must be reserved for the connection such as:

THE PEAK CELL RATE (PCR)

For large Cell Delay Variation Tolerance (CDVT) parameters, this solution is not sufficient to ensure the guaranteed Quality of service since cells may enter into the network as bursts at a much higher rate. On the other hand, this solution may lead to poor network utilization if the specified Sustainable Cell Rate (SCR) is very low (i.e, the average volume of traffic is low).

THE LINK ACCESS RATE

Although it ensures that QoS will be met whatever the traffic parameters could be, a reservation at link rate is mostly the worst case for network resources optimization, since it assumes that all cells would enter the network at this rate. A lot of resources would be wasted in this case.

A BANDWIDTH RESERVATION FUNCTION (such as "Equivalent Capacity") based on link rate, instead of Peak Rate: As before, it can easily be shown that the reserved capacity almost always overestimates the amount of resources reserved for the connection. Moreover, a high reservation rate increases the rejection probability by the Call Admission Control (CAC) function at connection setup since the path to be found must have on all its links a reservation level which allows the acceptance of that new connection.

On the other hand, the ITU I.371 standard specifies an upper bound for the Cell Delay Variation Tolerance (CDVT). Above this value, called $CDVT_{max}$, a connection can be rejected at connection setup.

$$\frac{CDVT_{\max}}{d} = \max\left[\frac{T}{D}, \alpha\left(1 - \frac{d}{T}\right)\right]$$

where:
- d (seconds) is the slot duration (1/link rate),
- α is arbitrarily fixed to 80.

Thus, another alternative for the network CAC is to reject simply all connections for which the specified Cell Delay Variation Tolerance (CDVT) parameter exceeds $CDVT_{max}$.

A specific solution to the problem is as follows:

Call Admission Control Procedure

At connection setup, a Traffic Descriptor (set of traffic parameters) is declared at the User Network Interface (UNI) of the Access Node of the first network crossed by the ATM connection. Upon reception of this Traffic Descriptor (TD), the Call Admission Control (CAC) function takes the decision to accept or to reject the connection according to the declared traffic parameters and the network resources reservation strategy.

- In a first step, the CAC procedure determines the resources to reserve in the network according to the Traffic Descriptor declared at connection setup.
- In a second step, if the connection is accepted, the GCRA parameters are initialized according to the Traffic Descriptor (TD).

Figure 4:
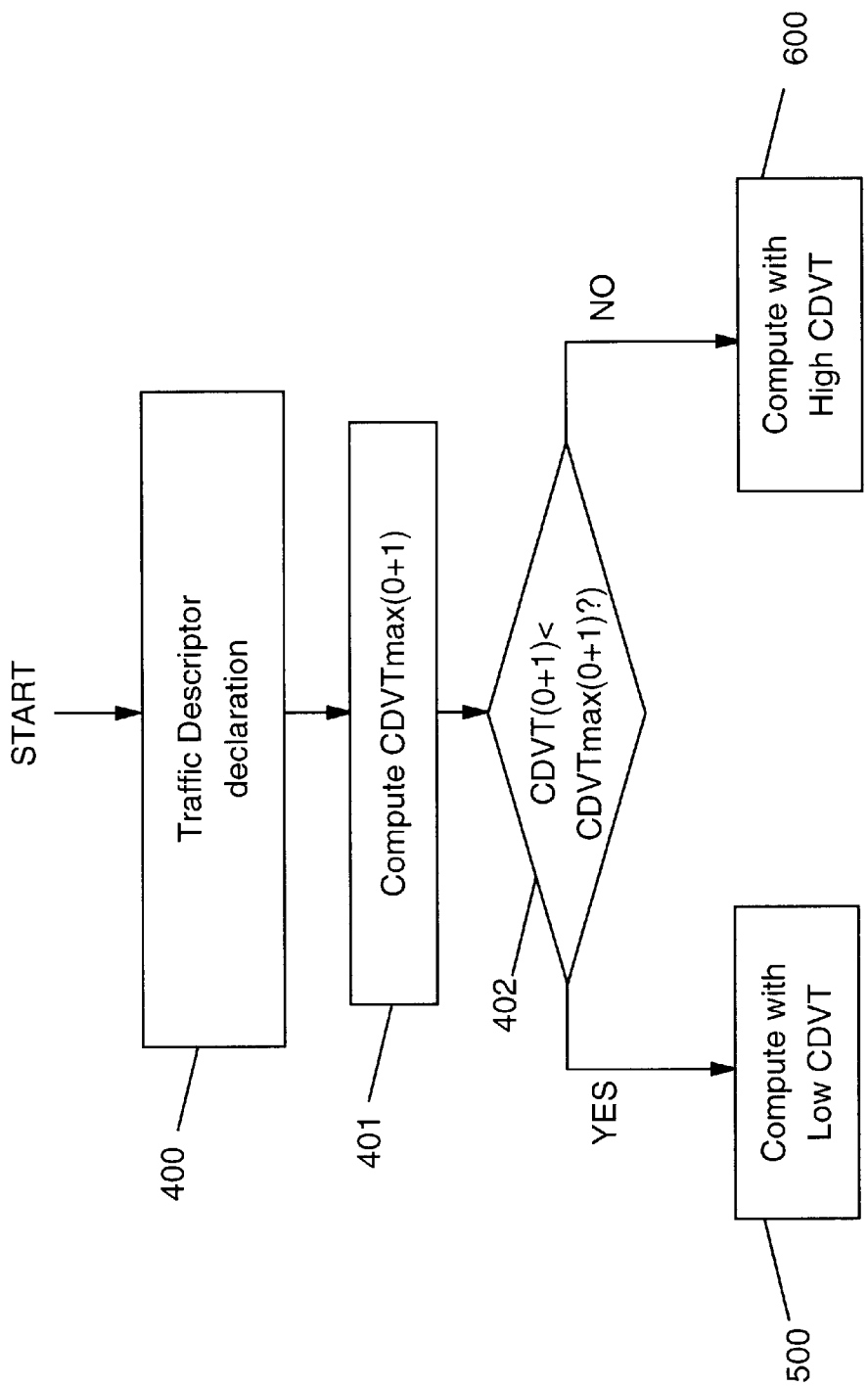
FIG. 4 shows a general view of the bandwidth reservation process according to the claimed invention.
Figure 5:
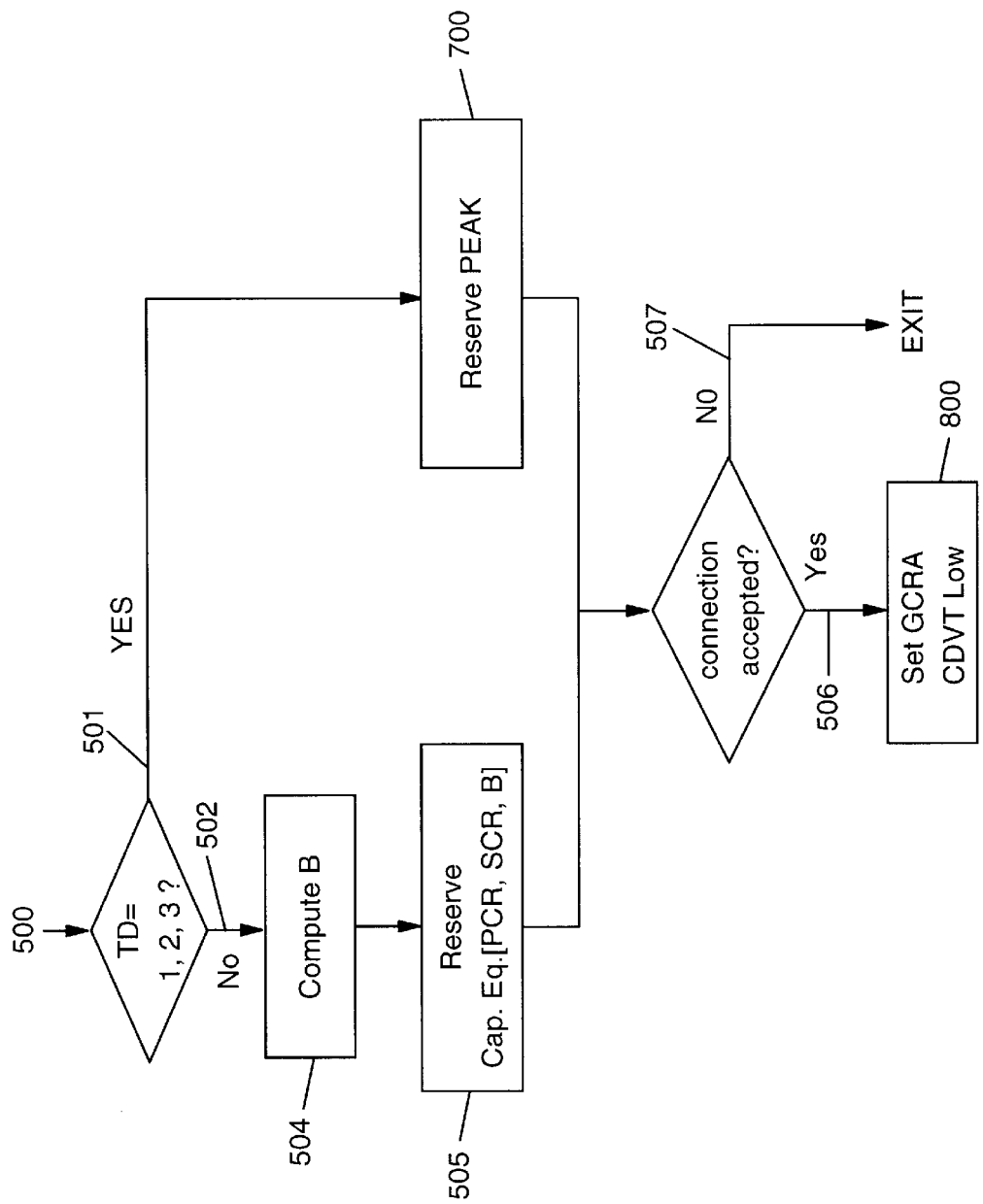
FIG. 5 shows the traffic reservation process for "low CDVT" connections according to the claimed invention.
Figure 6:
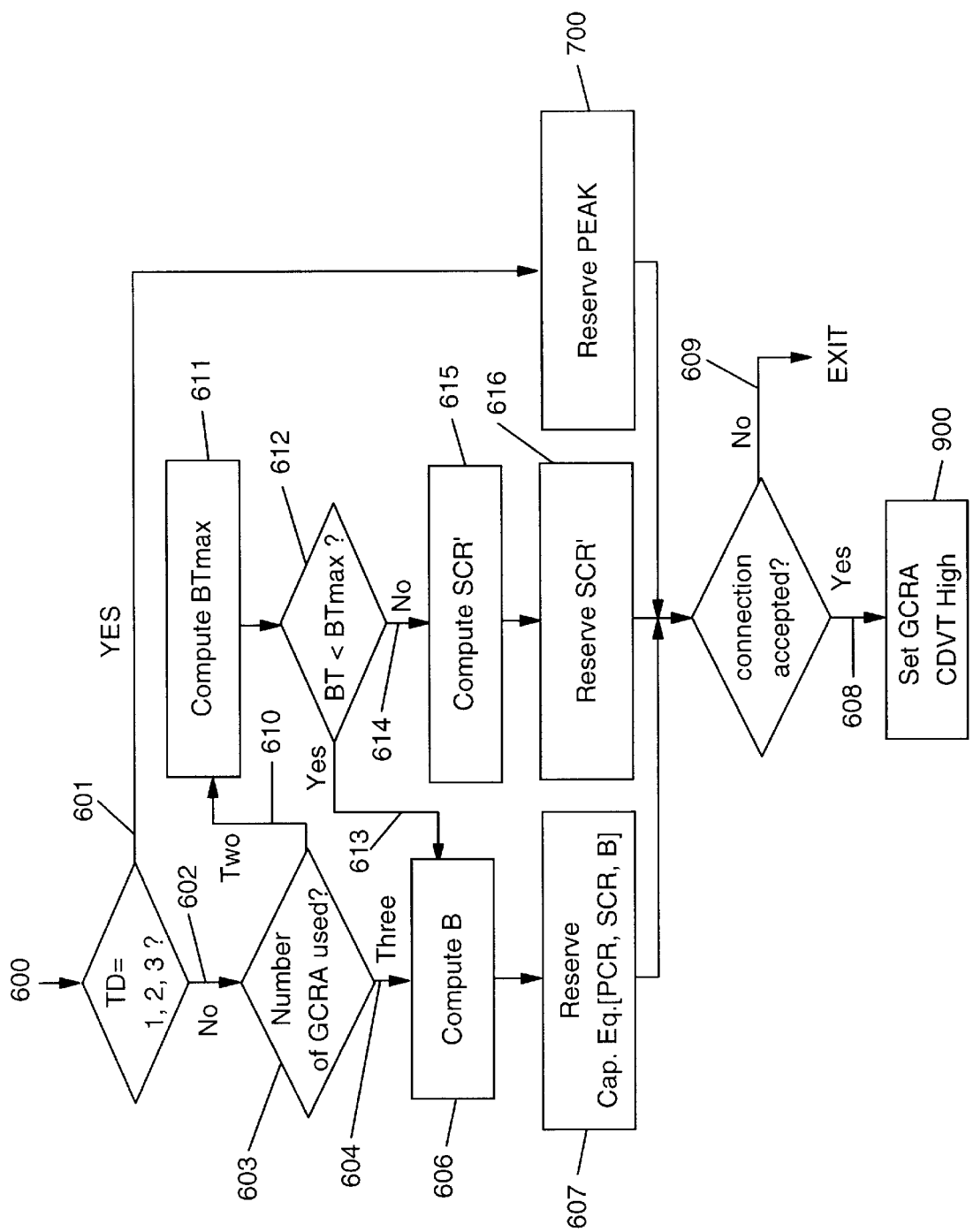
FIG. 6 shows the traffic reservation process for "high CDVT" connections according to the claimed invention.

FIG. 4 shows a general view of the bandwidth reservation process. Whatever the Traffic Descriptor is 400, the Peak Cell Rate (for CLP=0+1) must be specified. A bound value $CDVT_{bound}(0+1)$ is first computed 401:

If CDVT(0+1) is less than or equal to $CDVT_{bound}$, the Call Admission Control (CAC) procedure is the one for connections with "Low CDVT" 500, FIG. 5, Else the CAC procedure is the one for connections with "High CDVT" 600, FIG. 6.

In a preferred embodiment, the $CDVT_{bound}$ value is defined as equal to the maximum value $CDVT_{max}$ specified in the ITU standard. However, another value could be arbitrarily used, according to the network bandwidth management characteristics and strategies. The bound value will be named indifferently $CDVT_{bound}$ or $CDVT_{max}$ in the present application.

In both cases ("Low CDVT" and "High CVDT" connections), the bandwidth reservation is based on the definition of an "Equivalent Capacity". In a preferred embodiment, the Call Admission Control (CAC) process uses the definition previously mentioned and detailed in U.S. Pat. No. 5,289,462 Ahmadi et al.

CAC for Connections with Low Cell Delay Variation Tolerance

When "low CDVT" is specified, the Burst Tolerance (BT) parameter is translated into a Mean Burst Duration (B) in order to satisfy the definition of the burst parameter of the Equivalent Capacity. A fixed probability of occurrence is associated with the BT (i.e., BT is defined as a quantile). The Mean Burst Duration (B) can then be deduced from the probability law assumed for the distribution of the burst duration. Replacing BT by B in the equation of the Equivalent Capacity allows to still guarantee the Quality of Service (QoS) requirement associated with the connection, while optimizing network resources utilization. The distribution of the bursts duration is assumed to be a negative exponential function given by:

$$f(x) = \frac{1}{B} e^{-\frac{x}{B}}$$

where B is the Mean Burst Duration. The probability to have a burst duration longer than a given value X is given by:

$$P[x > X] = e^{-\frac{x}{B}}$$

Let Q be the quantile associated with the burst duration BT. Clearly:

$$Q = e^{-\frac{BT}{B}}$$

Then the Mean Burst Duration B can simply be deduced $$B = \frac{BT}{\ln(1/Q)}$$

FIG. 5 shows the traffic reservation process for "low CDVT" connections.

Figure 7:
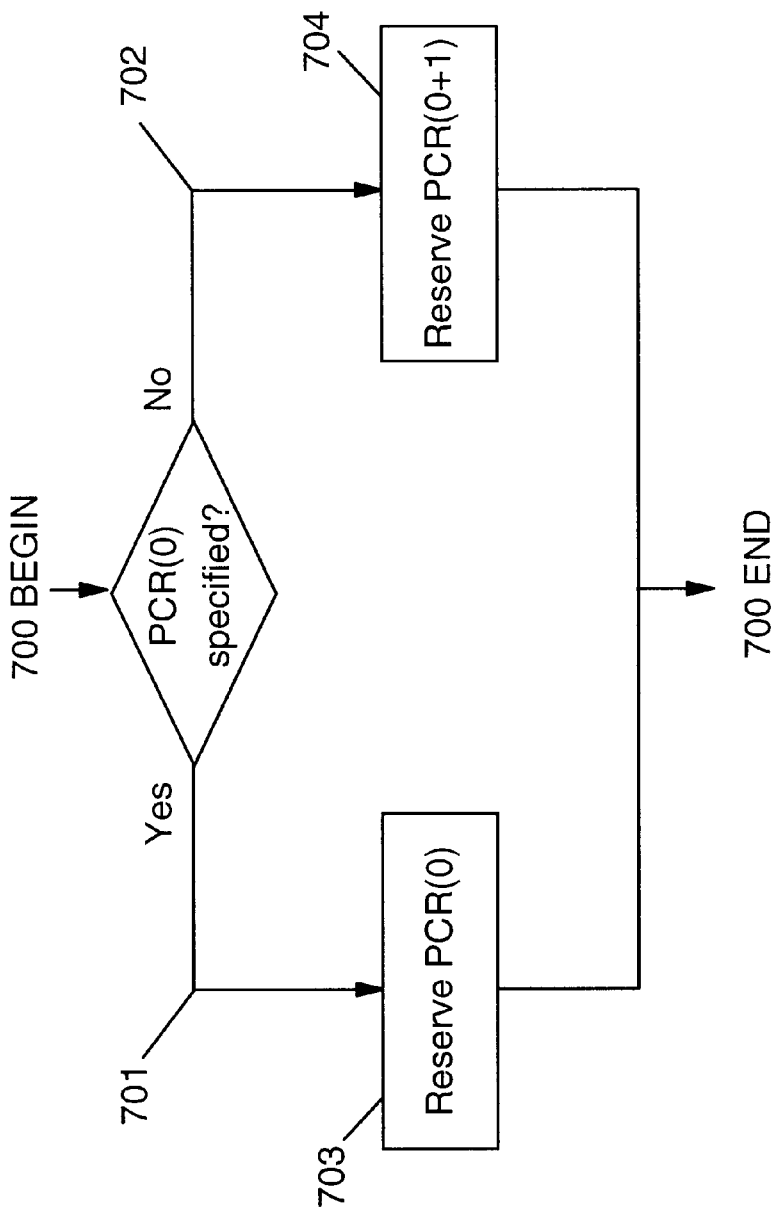
FIG. 7 shows the Peak Cell Rate reservation process for "low CDVT" and "high CDVT" connections according to the claimed invention.

If the Cell Delay Variation Tolerance (CDVT) is less than $CDVT_{max}$ 500, and if the Traffic Descriptor (TD) is either 1, 2, or 3 (501), the bandwidth that will be reserved for the connection will be based on the Peak Cell Rate value. FIG. 7 shows this reservation mechanism. Whether PCR(0) is specified 701, or not 702, PCR(0) 703 or PCR(0+1) 704 is reserved.

Figure 8:
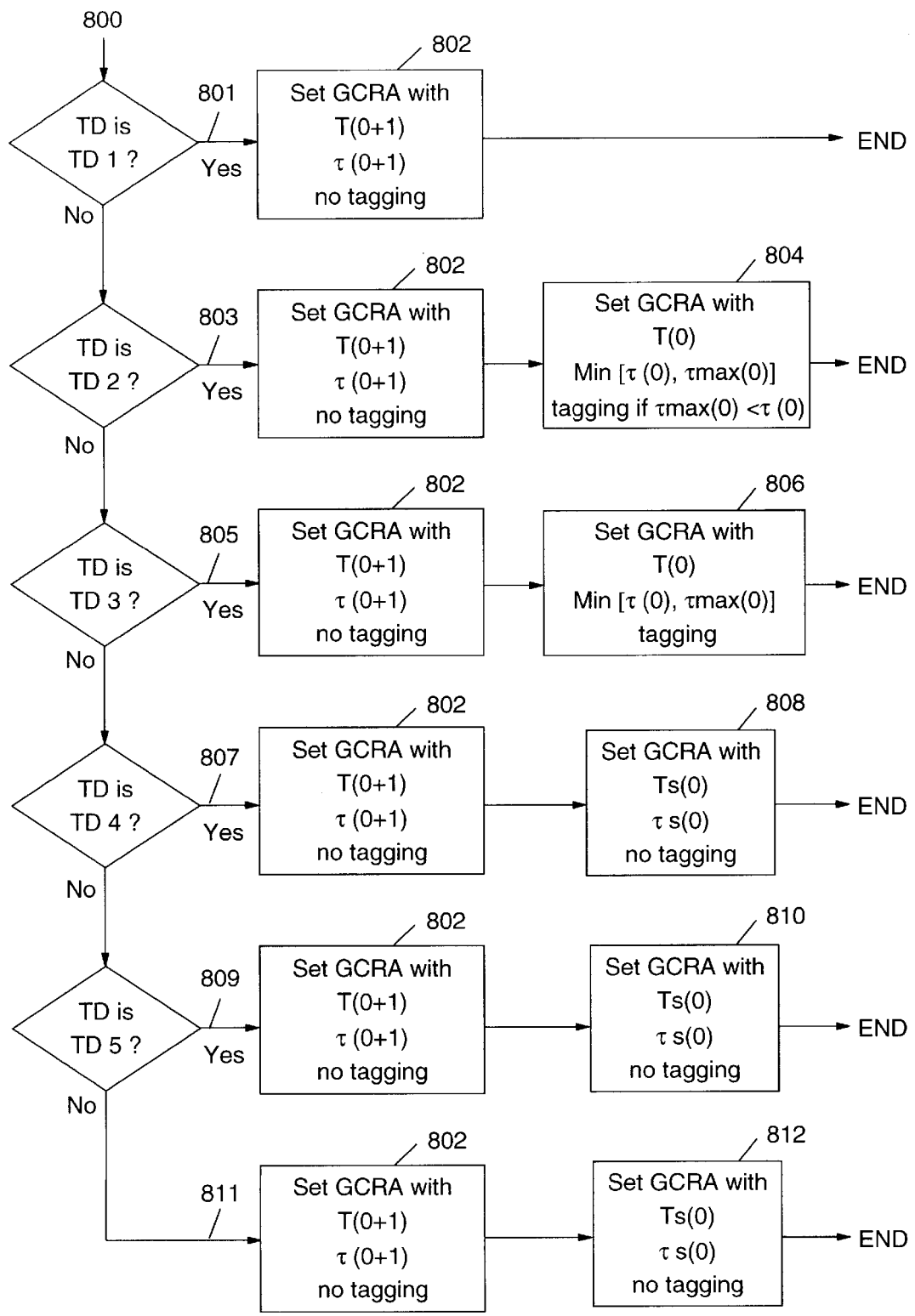
FIG. 8 shows the initialization of the policing parameters based on Traffic Descriptors for "low CDVT" connections according to the claimed invention.

If the connection is accepted 506 which means that a path within the network has been found and that each link along said path has enough available capacity (i.e, PCR(0+1) or PCR(0)) to accept this new connection, then the policing parameters are initialized 800 as illustrated in FIG. 8.

If the connection request is rejected, the Call Admission Control (CAC) procedure ends up 507.

If the Cell Delay Variation Tolerance (CDVT) is less than $CDVT_{max}$ 500, and if the Traffic Descriptor (TD) is either 4, 5, or 6 (i.e., a SCR parameter has been specified as 502, then the burst tolerance BT is converted into a Mean Burst Duration (B) in order to compute the Equivalent Capacity 504. In a preferred embodiment, due to the fact that the bandwidth reservation function (namely the Equivalent Capacity) is based on a Mean Burst Duration (B) and that this Mean Burst Duration is exponentially distributed, it is assumed that the probability of occurrence of a burst duration longer than BT is less than $10^{-6}$ or $10^{-8}$. Then the Mean Burst Duration is taken equal to:

$$B = \frac{BT}{\ln(1/Q)}$$

where Q is the defined quantile.

The bandwidth to reserve for that connection is based on the Equivalent Capacity c computed with parameters PCR, SCR and B 505.

If the connection is accepted 506, then the policing parameters are initialized 800 as illustrated in FIG. 8.

If the connection request is rejected, the Call Admission Control (CAC) procedure ends up 507.

CAC for Connections with High Cell Delay Variation Tolerance

When "high CDVT" is specified, a minimal Quality of Service (QoS) level (in respect with a given bound, for example $CDVT_{max}$) is guaranteed. Depending on the specified Traffic Descriptor, the bandwidth reservation is based either on the Peak Cell Rate or on any bandwidth reservation function (such as the Equivalent Capacity). The associated policing mechanism, based on two (or three) GCRA used in tandem, is also defined. The bandwidth reservation process and the associated policing mechanism allow to:

1. Meet the minimal QoS requirements associated with the connection;
2. Protect the network from potentially highly bursty traffic; and
3. Optimize the network resources utilization.

FIG. 6 shows the traffic reservation process for "high CDVT" connections.

If the Cell Delay Variation Tolerance (CDVT) is higher than $CDVT_{max}$ 600, and if the Traffic Descriptor is either 1, 2, or 3 (601), the bandwidth that will be reserved for the connection will be on the Peak Cell Rate value. FIG. 7 shows this reservation mechanism. Whether PCR(0) is specified 701 or not 702, PCR(0) 703 or PCR(0+1) 704 is reserved.

Figure 9:
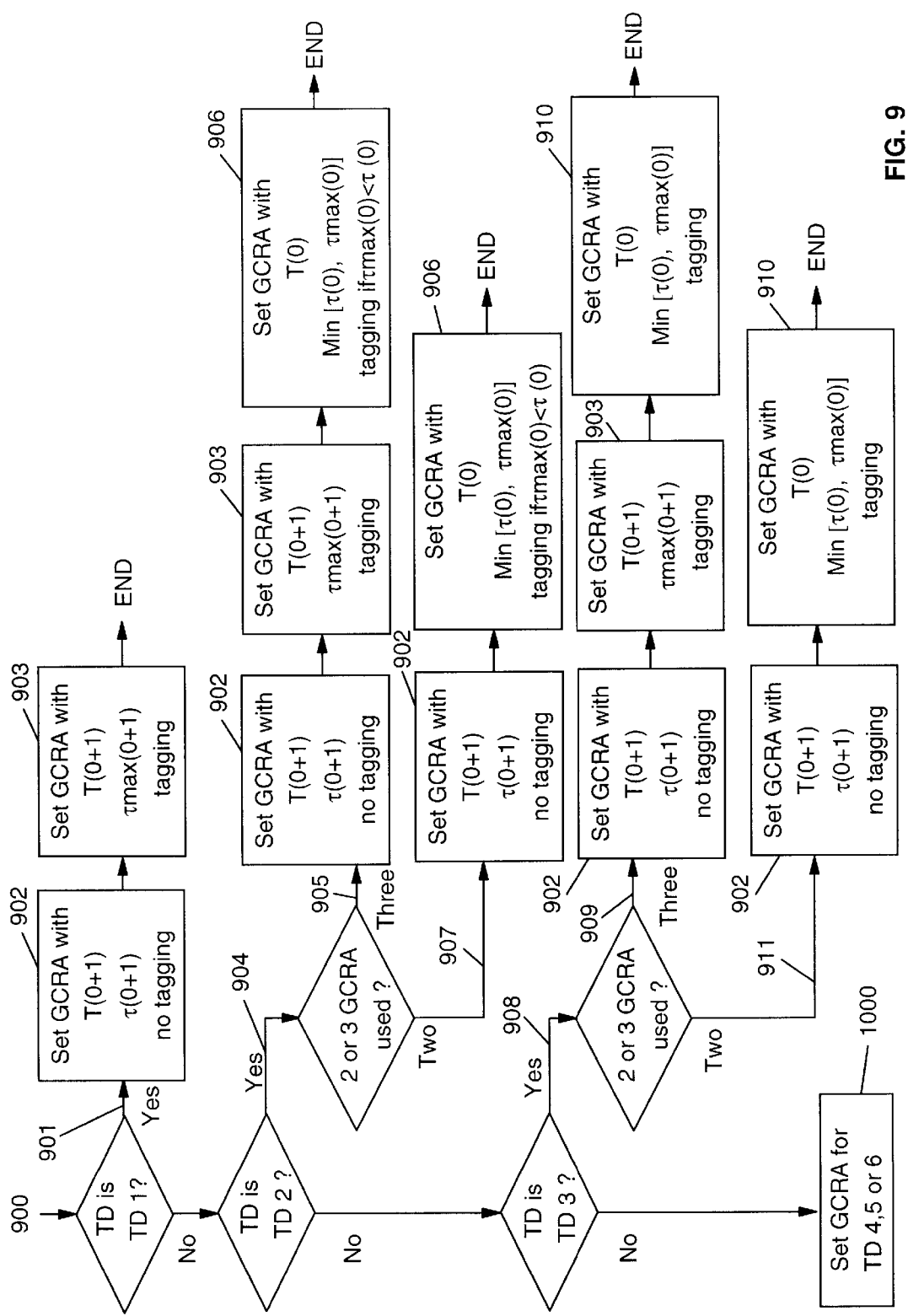
FIG. 9 shows the initialization of the policing parameters for Traffic Descriptors 1, 2 and 3 for "high CDVT" connections according to the claimed invention.

If the connection is accepted 608 which means that a path within the network has been found and that each link along said path has enough available capacity (i.e., PCR(0+1) or PCR(0)) to accept this new connection, then the policing parameters are initialized 900 as illustrated in FIG. 9.

If the connection request is rejected, the Call Admission Control (CAC) procedure ends up 609.

If the Cell Delay Variation Tolerance (CDVT) is higher than $CDVT_{max}$ 600, and if the Traffic Descriptor (TD) is either 4, 5, and 6 (602) (i.e., a SCR parameter has been specified), two embodiments of the invention are possible, depending on either the implementation relies on three GCRAs or only on two GCRAs at UPC/NPC level 603.

Three GCRA Can be Used at UPC/NPC Level (604)

Figure 10:
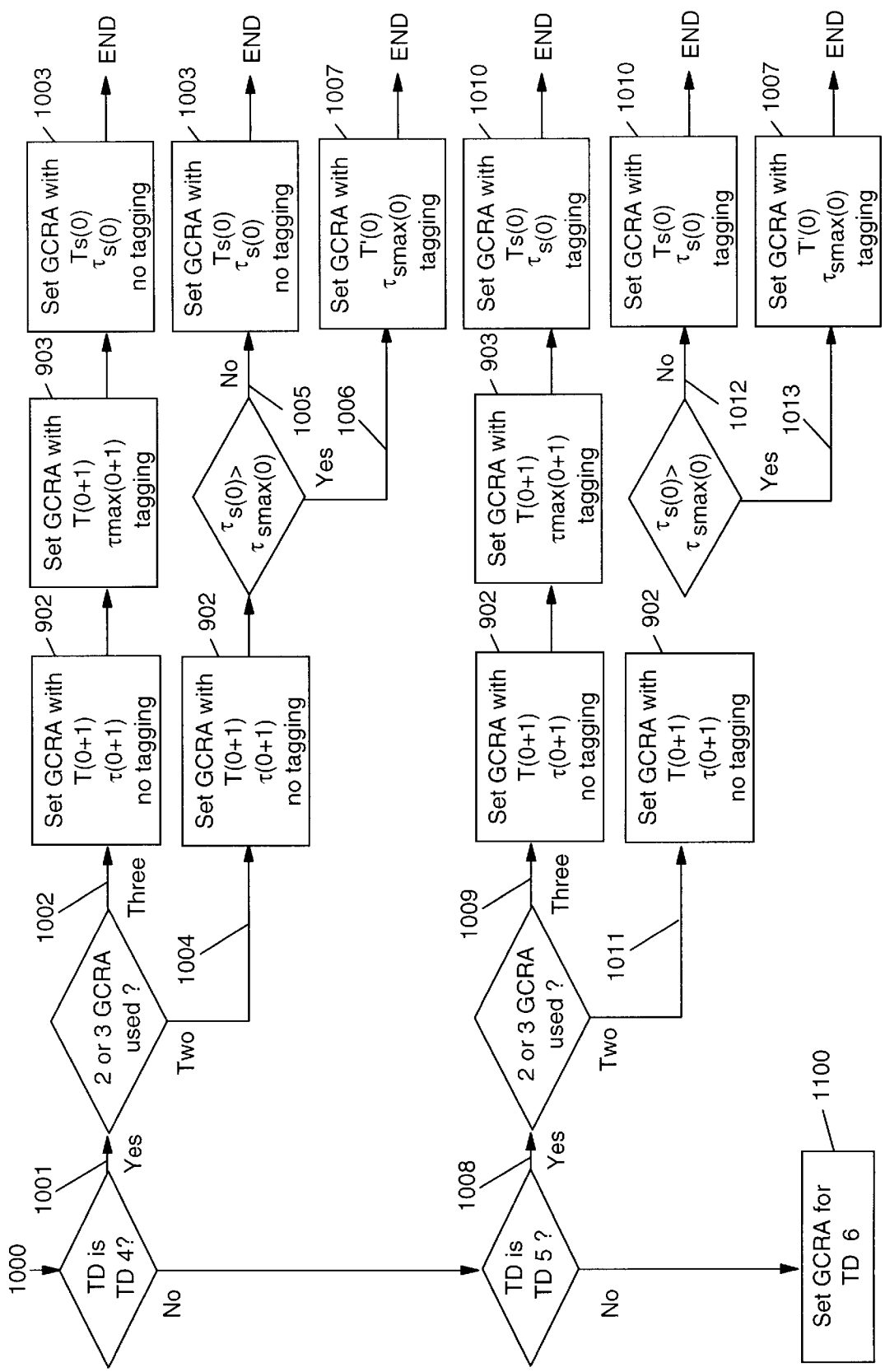
FIG. 10 shows the initialization of the policing parameters for Traffic Descriptors 4 and 5 for "high CDVT" connections according to the claimed invention.
Figure 11:
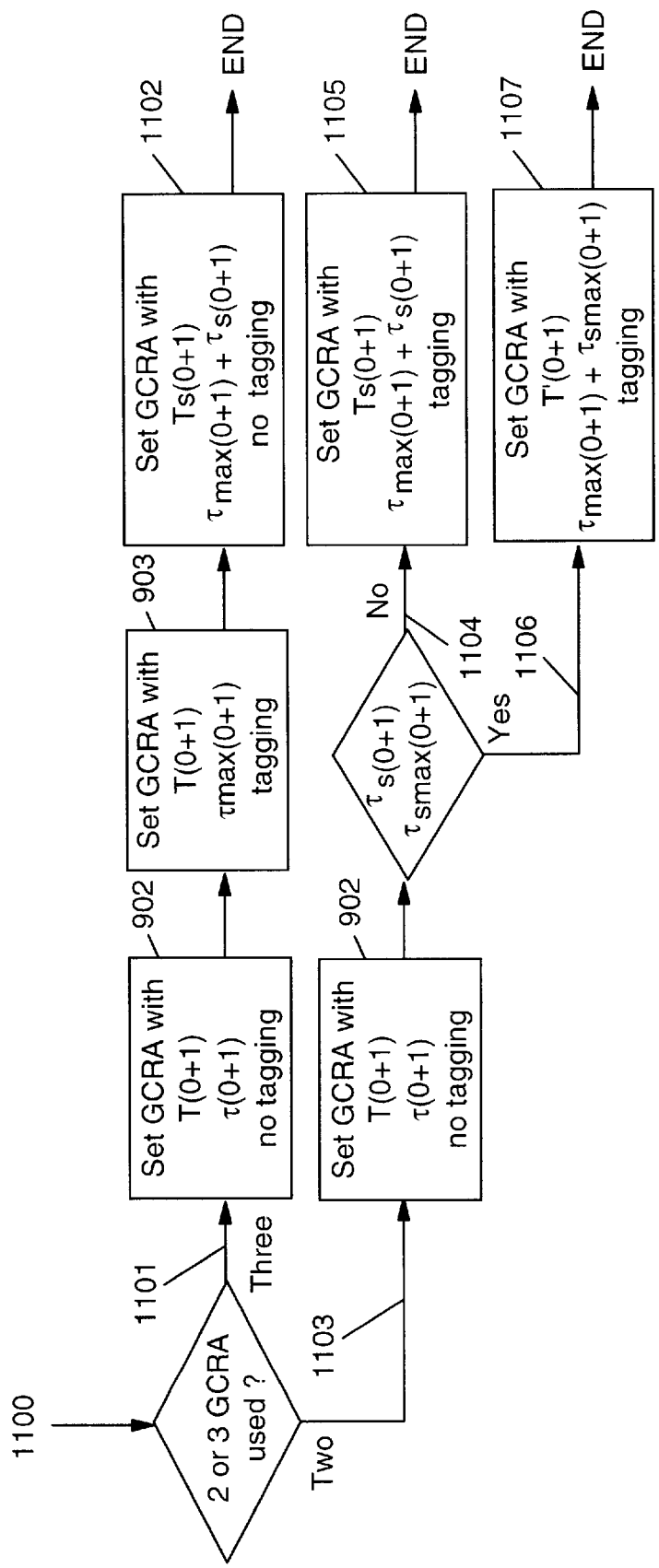
FIG. 11 shows the initialization of the policing parameters for Traffic Descriptors 6 for "high CDVT" connections according to the claimed invention.

With three GCRAs at UPC/NPC level, all the Traffic Descriptor parameters can be controlled independently as illustrated in FIGS. 9, 10 and 11:

PCR(0+1), CDVT(0+1) are used in the first GCRA,

PCR(0+1), $CDVT_{ref}$ (0+1) with tagging are used in the second GCRA, and

PCR(0), CDVT(0) or SCR(0), BT(0) or SCR(0+1), BT(0+1) are used in the third GCRA.

In a preferred embodiment the value $CDVT_{ref}$ in all the GCRAs is taken equal to $CDVT_{max}$, but another value can be advantageously used. The $CDVT_{ref}$ value will also be named indifferently $CDVT_{ref}$ or $CDVT_{max}$ in the present application.

A reservation based on the Equivalent Capacity is then possible. The Burst Tolerance (BT) is translated into a Mean Burst Duration (B) 606. The Equivalent Capacity ĉ is calculated with the Peak Cell Rate (PCR), the Sustainable Cell Rate (SCR) and the Mean Burst Duration (B) 607:

If the connection is accepted 608, then the policing parameters are initialized 900 as illustrated in FIG. 9, Else the connection request is rejected and the Call Admission Control Procedure ends up 609.

Two GCRA are Used at UPC/NPC Level (610)

With only two GCRAs, it is no more possible to control independently the Peak Cell Rate (PCR) associated with CDVT, the Peak Cell Rate (PCR) associated with $CDVT_{ref}$, and any other traffic parameter such as the Sustainable Cell Rate (SCR) associated with the Burst Tolerance (BT). Thus, a reservation based on the Equivalent Capacity is not possible if the specified Burst Tolerance (BT) parameter is high. A large number of cells may cross the second GCRA at a rate much higher than the Peak Cell Rate (PCR). The decision to base the reservation on the Equivalent Capacity or not is taken by comparing the value of the Burst Tolerance (BT) parameter with an upper bound $BT_{bound}$ (also called $BT_{max}$ to be consistent with the definition of $CDVT_{max}$) 611.

In a preferred embodiment, $BT_{max}$ is computed with the the same equation than $CDVT_{max}$ (T and d are replaced respectively by $T_s(=1/SCR)$ and T). However, another value for $BT_{max}$ can advantageously be used.

$$\frac{BT_{max}}{T} = \max\left[\frac{T_s}{T}, a\left(1 - \frac{T}{T_s}\right)\right]$$

Depending on the value of the Burst Tolerance (BT) parameter in regard with $BT_{max}$ 612:

If BT is low (i.e, less than or equal to $BT_{max}$) 613, the same process than for TD 4, 5 or 6 with low CDVT is applied:

Conversion of BT into B 606 and bandwidth reservation based on ĉ with parameters PCR, SCR, and B 607.

If the connection is accepted 608, then the policing parameters are initialized 900 as illustrated in FIG. 9, Else the connection request is rejected and the Call Admission Control (CAC) procedure ends up 609.

If BT is high (i.e, greater than $BT_{max}$) 614, then a reservation based on PCR(0+1) should be performed.

However, it is possible to still save some bandwidth by computing a couple (SCR', BT')—with SCR' relatively close to (but less than) PCR and BT' equals $BT_{ref}$—for which the behavior of GCRA(SCR', BT') is exactly the same than GCRA(SCR, BT) when the incoming traffic is a cell stream at PCR exactly.

In a preferred embodiment the value $BT_{ref}$ in all the GCRAs is taken equal to $BT_{max}$, but another value can be advantageously used. The $BT_{ref}$ value will be named indifferently $BT_{ref}$ or $BT_{max}$ in the present application.

SCR' is computed using $BT_{ref}$ 615 in the following expression:

$$SCR' = \frac{1}{T + \dfrac{BT_{ref}}{Int\left[1 + \dfrac{BT}{(T_s - T)}\right]}}$$

The Bandwidth is reserved according to the computed value of SCR' for the connection 616.

If the connection is accepted 608, then the policing parameters are initialized 900 as illustrated in FIG. 9.

Else the connection request is rejected, and the Call Admission (CAC) procedure ends up 609.

GCRA: Initialization and Operations Modes

Once the connection has been accepted, which implies that bandwidth is reserved on each link along the connection path according to the Traffic Descriptor, the GCRAs must be initialized at UPC/NPC level.

For some Traffic Descriptors, in particular for connections with "high CDVT", the GCRA parameters are initialized depending on the number of GCRA used (two or three) at UPC level. Although the present policing mechanism requires the use of three GCRAs for some Traffic Descriptors it is however possible to use only two. This results in a loss of accuracy, since three couples (cell rate, associated tolerance) must be controlled with two GCRAs only. In order to not discard cells which conform to the three GCRAs, a tagging option can be enabled whatever the type or traffic. Compared to prior art, this tagging option is not limited to high priority traffic (CLP=0) but also applies to the aggregate traffic (CLP=0+1). For more clarity, the description will mention for each GCRA whether the tagging option is enabled or not. This tagging option is transparent and complies with standards as long as the Cell Delay Variation Tolerance (CDVT) specified for the connection at call setup for the global traffic (CLP=0+1) is less than $CDVT_{max}$ ("Low CDVT" connections). For "high CDVT" connections, the assumption does not comply with current standards, because the tagging option is not defined for the aggregate traffic (aggregation of high and low priority traffic, CLP=0+1). However, the bandwidth reservation process associated with the policing mechanism according to the present invention is more flexible compared with current standard specifications, since it allows to accept connections with "high CDVT" values. According to ITU-T standard, such connections would have been simply rejected, only because of their too high CDVT value.

Depending on a connection has been classified "low CDVT" or "high CDVT" during connection setup, the GCRAs are initialized differently as described in FIGS. 8, 9, 10, 11.

GCRA with Low Delay Variation Tolerance

FIG. 8 shows the initialization of the policing parameters based on Traffic Descriptors for "low CDVT" connections.

Traffic Descriptor TD1(801)
INITIALIZATION
The GCRA is initialized with T(0+1), τ(0+1). Tagging is disabled 802.
OPERATION MODE
All the traffic (the high and low priority traffic, i.e, with CLP=0 and CLP=1) sent by the source is controlled by the GCRA before being transmitted to the network:
Traffic which conforms to GCRA(T(0+1), τ(0+1)) is transmitted directly to the network.
Traffic which does not conform to the GCRA is discarded.

Traffic Descriptor TD2(803)
INITIALIZATION:
The first GCRA is initialized with T(0+1), τ(0+1). Tagging is disabled 802.
The second GCRA is initialized with T(0) and the minimum value between τ(0) and $\tau_{max}(0)$, with $\tau_{max}(0)$=CDVT $sub_{max}$ for high priority traffic (CLP=0). Tagging is enabled if $\tau_{max}(0)$ is less than τ(0) 804.
OPERATION MODE:
All the traffic (i.e, with CLP=0 and CLP=1) sent by the source is processed by the first GCRA:
Low priority traffic (with CLP=1) which conforms to GCRA(T(0+1), τ(0+1)) is transmitted directly to the network.
High priority traffic (with CLP=0) which conforms to GCRA(T(0+1), τ(0+1)) is processed by the second GCRA.
Traffic which does not conform to the GCRA is discarded.
At second GCRA
If τ(0) is less than or equal to $\tau_{max}(0)$
Traffic which conform to GCRA(T(0), τ(0)) is transmitted to the network,
Traffic which does not conforms to the GCRA is discarded.
If $\tau_{max}(0)$ is less than τ(0):
Traffic which conforms to GCRA(T(0), $\tau_{max}(0)$ is transmitted to the network 207,
Traffic which does not conform to the GCRA is converted into low priority traffic (CLP=1) and transmitted to the network.

Traffic Descriptor TD3 (805)
Initialization and Operation principles are the same than for TD2, except than tagging is always enabled in second GCRA, i.e, whatever the tolerance which is selected: τ(0) or $\tau_{max}(0)$ 806.

Traffic Descriptor TD4 (807)
INITIALIZATION
The first GCRA is initialized with T(0+1), τ(0+1). Tagging is disabled 802.
The second GCRA is initialized with $T_s(0)$, $\tau_s(0)$ Tagging is disabled 808.
OPERATION MODE
All the traffic (i.e. with CLP=0 and CLP=1) sent by the source is processed by the first GCRA:
Low priority traffic (with CLP=1) which conforms to GCRA(T(0+1), τ(0+1)) is transmitted directly to the network.
High priority traffic (with CLP=0) which conforms to GCRA(T(0+1), τ(0+1)) is processed by second GCRA.
Traffic which does not conform to the GCRA is discarded.
At second GCRA
Traffic which conforms to GCRA($T_s(0)$, $\tau_s(0)$) is transmitted to the network.
Traffic which does not conforms to the GCRA discarded.

Traffic Descriptor TD5 (809)
INITIALIZATION AND OPERATING PRINCIPLES are the same than for TD4, except than tagging is enabled in second GCRA 810.

Traffic Descriptor TD6 (811)
INITIALIZATION
The first GCRA is initialized with T(0+1), τ(0+1). Tagging is disabled 802.
The second GCRA is initialized with $T_s(0+1)$, $\tau_s(0+1)$. Tagging is disabled 812.
OPERATION MODE:
All the traffic (i.e, with CLP=0 and CLP=1) sent by the source is processed by the first GCRA:
Low priority traffic (with CLP=1) and High priority traffic (with CLP=0) which conform to GCRA(T(0+1), τ(0+1)) is processed by second GCRA.
Traffic which does not conform to GCRA is discarded.
At Second GCRA
Traffic which conforms to GCRA(T sub s (0+1), $\tau_s(0+1)$) is transmitted to the network.
Traffic which does not conform to the GCRA is discarded.

GCRA with High Delay Variation Tolerance
FIG. 9, 10, 11 show the initialization of the policing parameters for "high CDVT" connections.
Refer to FIG. 9 for TD 1, TD 2 and TD 3, FIG. 10 for TD 4 and TD 5, FIG. 11 for TD6.

Traffic Descriptor TD1 (901)
INITIALIZATION
Two GCRAs are used:
The first GCRA is initialized with T(0+1), τ(0+1). Tagging is disabled 902.
The second GCRA is initialized with T(0+1) and $\tau_{max}$ (0+1), tagging is enabled 903.
OPERATION MODE
All the traffic (i.e, with CLP=0 and CLP=1) sent by the source is processed by the first GCRA.
Low priority traffic (with CLP=1) and High priority traffic (with CLP=0) which conform to GCRA(T(0+1), τ(0+1)) is processed by second GCRA.
Traffic which does not conform the GCRA is discarded.
At Second GCRA
Traffic which conforms to GCRA(T(0+1), $\tau_{max}(0+1)$) is transmitted to the network.
Traffic which does not conform the GCRA is converted into low priority traffic (CLP=1) and transmitted to the network.

Traffic Descriptor TD2 (904)
THREE GCRAS ARE USED AT UPC LEVEL (905)
INITIALIZATION
The first GCRA is initialized with T(0+1), τ(0+1). Tagging is disabled 902.
The second GCRA is initialized with T(0+1) and $\tau_{max}$ (0+1). Tagging is enabled 903.
The third GCRA is initialized with the minimum value of τ(0) and $\tau_{max}(0)$, with $\tau_{max}(0)$ equal to $CDVT_{max}$ computed for high priority traffic (CLP=0). Tagging is enabled if $\tau_{max}(0)$ is less than τ(0) 906.
OPERATION MODE
All the traffic (i.e, with CLP=0 and CLP=1) sent by the source is processed by the first GCRA.
Traffic which conforms to GCRA( T(0+1), τ(0+1)) is processed by the second GCRA.
Traffic which does not conforms to GCRA is discarded.
At Second GCRA
Low priority traffic (with CLP=1) which conforms to GCRA(T(0+1), $\tau_{max}(0+1)$) is transmitted directly to the network.
High priority traffic (with CLP=0) which conforms to GCRA( T(0+1), $\tau_{max}(0+1)$) is processed by third GCRA.

Traffic which does not conform to second GCRA is converted into low priority traffic (CLP=1) and transmitted to the network.

At Third GCRA

If $\tau(0)$ is selected (i.e $\tau(0)$ is less than or equal to $\tau_{max}(0)$ ):

Traffic which conforms to GCRA( T(0), $\tau(0)$) is transmitted to the network.

Traffic which does not conforms to the GCRA is discarded.

If $\tau_{max}(0)$ is selected ( $\tau_{max}(0)$ is less than $\tau(0)$ ):

Traffic which conforms to GCRA( T(0), $\tau_{max}(0)$) is transmitted to the network.

Traffic which does not conforms to the GCRA is converted into low priority traffic (CLP=1) and transmitted to the network.

TWO GCRAS ARE USED AT UPC LEVEL (907)

INITIALIZATION

The first GCRA is initialized with T(0+1), $\tau(0+1)$. Tagging is disabled 902.

The second GCRA is initialized with T(0) and the minimum value between $\tau(0)$ and $\tau_{max}(0)$, with $\tau_{max}(0)$ equal to $CDVT_{max}$ computed for the high priority traffic (CLP=0). Tagging is enabled if $\tau_{max}(0)$ is lower than $\tau(0)$ 906.

OPERATION MODE

All the traffic (i.e, with CLP=0 and CLP=1) sent by the source is processed by the first GCRA.

Low priority traffic (with CLP=1) which conforms to GCRA(T(0+1), $\tau(0+1)$) is transmitted directly to the network.

High priority traffic (with CLP=0) which conforms to GCRA( T(0+1), $\tau(0+1)$) is processed by second GCRA.

Traffic which does not conform to the GCRA is discarded.

At Second GCRA

If $\tau(0)$ is selected ( $\tau(0)$ is less than or equal to $\tau_{max}(0)$:

Traffic which conforms to GCRA(T(0), $\tau(0)$) is transmitted to the network.

Traffic which does not conforms to the GCRA is discarded.

If $\tau sub_{max}(0)$ is selected ($\tau_{max}(0)$ is less than $\tau(0)$),

Traffic which conforms to GCRA( T(0), $\tau_{max}(0)$) is transmitted to the network.

Traffic which does not conform to the GCRA is converted into low priority traffic (CLP=1) and transmitted to the network.

Traffic Descriptor TD3 (908)

INITIALIZATION AND OPERATION MODE are the same than for TD2 (two or three GCRAs), except than tagging is always enabled in the second GCRA 910 if two GCRAs are used 911, or in the third GCRA 910 if three GCRAs are used 909, and that whatever the tolerance selected: $\tau(0)$ or $\tau_{max}(0)$.

Traffic Descriptor TD4 (1001)

THREE GCRAS ARE USED AT UPC LEVEL (1002)

INITIALIZATION

The first GCRA is initialized with T(0+1), $\tau(0+1)$. Tagging is disabled 902.

The second GCRA is initialized with T(0+1) and $\tau_{max}(0+1)$ Tagging is enabled 903.

The third GCRA is initialized with T sub s (0), $\tau_s(0)$. Tagging is disabled 1003.

OPERATION MODE:

All the traffic (i.e, with CLP=0 and CLP=1) sent by the source is processed by the first GCRA.

Traffic which conforms to GCRA(T(0+1), $\tau(0+1)$) is processed by second GCRA.

Traffic which does not conform to GCRA is discarded.

At Second GCRA

Low priority traffic (with CLP=1) which conforms to GCRA(T(0+1), $\tau_{max}(0+1)$) is transmitted directly to the network.

High priority traffic (with CLP=0) which conforms to GCRA( T(0+1), $\tau_{max}(0+1)$) is processed by third GCRA.

Traffic which does not conform to the GCRA is converted into low priority traffic (CLP=1) and transmitted to the network.

At Third GCRA

Traffic which conforms to GCRA( T sub s (0), $\tau_s(0)$) is transmitted to the network.

Traffic which does not conform the GCRA is discarded.

TWO GCRAS ARE USED AT UPC LEVEL (1004)

INITIALIZATION

The first GCRA is initialized with T(0+1), $\tau(0+1)$. Tagging is disabled 902.

The initialization of the second GCRA depends on the value of $\tau(0)$ in regard with $\tau_{s\,max}(0)$, with $\tau_{s\,max}$ equal to $BT_{max}$ (=BT sub ref).

If $\tau_s(0)$ is less than or equal to $\tau_{s\,max}(0)$ 1005, the second GCRA is initialized with $T_s(0)$, $\tau_s(0)$ Tagging is disabled 1003.

If $\tau_s(0)$ is greater than $\tau_{s\,max}(0)$ 1006, then the second GCRA is initialized with T' (0), $\tau_{s\,max}(0)$ 1007.

T'(0) is the period corresponding to the computed rate SCR' (0). Tagging is enabled.

OPERATION MODE

All the traffic (i.e, with CLP=0 and CLP=1) sent by the source is processed by the first GCRA.

Low priority traffic (with CLP=1) which conforms to GCRA(T(0+1), $\tau(0+1)$)is transmitted directly to the network.

High priority traffic (with CLP=0) which conforms to GCRA(T(0+1), $\tau(0+1)$ ) is processed by second GCRA.

Traffic which does not conform the GCRA is discarded.

At Second GCRA

If $\tau s(0)$ is selected ($\tau s(0)$ is less than or equal to $\tau_s(0)$):

Traffic which conforms to GCRA($T_s(0)$, $\tau_s(0)$) is transmitted to the network.

Traffic which does not conform to GCRA is discarded.

If $\tau_{max}(0)$ is selected ($\tau_{max}(0)$ is less than $\tau(0)$)

Traffic which conforms to GCRA( T'(0), $\tau_{s\,max}(0)$) is transmitted to the network.

Traffic which does not conform to the GCRA is converted into low priority traffic (CLP=1) and transmitted to the network.

Traffic Descriptor TD5 (1008)

INITIALIZATION AND OPERATION MODE are the same than for TD4 (two or three GCRAs), except than tagging is always enabled in the second GCRA 1010, 1007 if two GCRAs are used, or in the third GCRA 1010 if three GCRAs are used, and that whatever the tolerance which is selected: $\tau_s(0)$ or $\tau_{s\,max}(0)$.

Traffic Descriptor TD6 (1100)

THREE GCRAS ARE USED AT UPC LEVEL (1101)

INITIALIZATION

The first GCRA is initialized with T(0+1), $\tau(0+1)$. Tagging is disabled 902.

The second GCRA is initialized with T(0+1)and $\tau_{max}$ (0+1). Tagging is enabled 903.

The third GCRA is initialized with $T_s(0+1)$, $\tau_{max}(0+1)+ \tau_s(0+1)$.

Tagging is disabled 1102. The first term $\tau_{max}(0+1)$ in the tolerance parameter is used to take into account the tolerance measurement on the Peak Cell Rate for the CLP=0+1 traffic.

OPERATION MODE

All the traffic (i.e, with CLP=0 and CLP=1) sent by the source is processed by the first GCRA.

Traffic which conforms to GCRA(T(0+1), $\tau$(0+1)) is processed by second GCRA.

Traffic which does not conform to the GCRA is discarded.

At Second GCRA

Traffic which conforms to GCRA( T(0+1), $\tau_{max}$ (0+1)) is processed by third GCRA.

Traffic which does not conform to GCRA is converted into low priority traffic (CLP=1) and is processed by third GCRA.

At Third GCRA

Traffic which conforms to GCRA($T_s$ (0+1), $\tau_{max}$ (0+1)+$\tau_s$ (0+1)) is transmitted to the network.

Traffic which does not conform the GCRA is discarded.

TWO GCRAS ARE USED AT UPC LEVEL (1103)

INITIALIZATION

The first GCRA is initialized with T(0+1), $\tau$(0+1). Tagging is disabled 902.

The initialization of the second GCRA depends on the value of $\tau_s$ (0+1) in regard with $\tau_{s\ max}(0+1)$:

If $\tau_s$ (0+1) is less than or equal to $\tau_{s\ max}(0+1)$ 1104, the second GCRA is initialized with $T_s(0+1), \tau_{max}(0+1)+\tau_s$ (0+1). Tagging is enabled 1105.

If $\tau_s$ (0+1) is greater than $\tau_{s\ max}$ (0+1) 1106, then, the second GCRA is initialized with T' (0+1), $\tau_{max}(0+1)$+ $\tau s_{max}(0+1)$ 1107. T (0+1) is the period corresponding to the computed rate SCR' (0+1). Tagging is enabled.

OPERATION MODE

All the traffic (i.e, with CLP=0 and CLP=1) sent by the source is processed by the first GCRA.

Traffic which conforms to GCRA(T(0+1), $\tau$(0+1)) is processed by second GCRA.

Traffic which does not conform to the GCRA is discarded.

At Second GCRA

If $\tau_s$ (0+1) is selected ($\tau_s$(0+1)is less than or equal to $\tau_{s\ max}(0+1)$ Traffic which conforms to GCRA($T_s(0+1), \tau_{max}$ (0+1)+ $\tau_s(0+1)$ is transmitted to the network.

Traffic which does not conform to GCRA is converted into low priority traffic (CLP=1) and transmitted to the network.

If $\tau_{s\ max}(0+1)$ is selected ( $\tau\ \text{sub}_{s\ max}(0+1)$ is less than $\tau_s(0+1)$ ) :

Traffic which conforms to GCRA( T'(0+1), $\tau_{max}(0+1)$+ $\tau_{s\ max}(0+1)$) is transmitted to the network.

Traffic which does not conform to GCRA is converted into low priority traffic (CLP=1) and transmitted to the network.

Advantages

The present method defines a Call Admission Control procedure, associated with an Usage Parameter Control/Network Parameter Control mechanism, for:

Accepting not bursty connections and for satisfying the Quality of Service requested at connection setup, Accepting very bursty connections and for satisfying a minimal Quality of Service rather than simply rejecting them, Protecting the network from potentially highly bursty traffic, Determining a bandwidth reservation method based on a Mean Burst Length, For each connection, minimizing the bandwidth reservation while satisfying the required Quality of Service (QoS).

What is claimed is:

1. A method in an access node for reserving bandwidth for very bursty traffic according to a connection specified quality of service in a cell switching network comprising a plurality of access and transit nodes interconnected with transmission links, and for policing said traffic according to traffic parameters and tolerance values declared at connection setup, said tolerance values including a Cell Delay Variation Tolerance (CDVT) value, said method involving the steps of:

determining a Cell Delay Variation Tolerance bound value ($CDVT_{bound}$), if the declared Cell Delay Variation Tolerance (CDVT) value is less than or equal to the Cell Delay Variation Tolerance bound value ($CDVT_{bound}$), bandwidth is reserved in order to satisfy the specified quality of service;

if the declared Cell Delay Variation Tolerance (CDVT) value is greater than the Cell Delay Variation Tolerance bound value($CDVT_{bound}$), bandwidth is reserved and traffic is policed in order to satisfy a quality of service based on new defined traffic parameters and tolerance values.

2. The method according to claim 1 wherein, if the declared Cell Delay Variation Tolerance (CDVT) value is greater than the Cell Delay Variation Tolerance bound value ($CDVT_{bound}$), traffic with a Cell Delay Variation (CDV) greater than the declared Cell Delay Variation Tolerance value (CDVT) is discarded; and traffic with a Cell Delay Variation (CDV) greater than a predefined Cell Delay Variation Tolerance reference value (CDVT sub ref) and less than the declared Cell Delay Variation Tolerance value (CDVT), is converted into low priority traffic.

3. The method according to claim 2 wherein the traffic (CLP=0+1) on the connection is made up of low (CLP=1) and high (CLP=0) priority traffic and declared parameters and tolerance values define either:

a first traffic descriptor with:
   a Peak Cell Rate for an aggregate with low an high priority traffic PCR(0+1);
   a Cell Delay Variation Tolerance for the aggregate traffic CDVT(0+1);

or, a second traffic descriptor with:
   PCR(0+1), CDVT(0+1);
   a Peak Cell Rate for high priority traffic PCR(0);
   a Cell Delay Variation Tolerance for high priority traffic CDVT(0);

or, a third traffic descriptor with:
   PCR(0+1), CDVT(0+1), PCR(0), CDVT(0);
   tagging enabled;

or, a fourth traffic descriptor with:
   PCR(0+1), CDVT(0+1);
   a Sustainable Cell Rate for high priority traffic SCR(0)
   a Burst Tolerance for high priority traffic BT(0);

or, a fifth traffic descriptor with:
   PCR(0+1), CDVT(0+1), SCR(0), BT(0);
   tagging enabled;

or, a sixth traffic descriptor with:

PCR(0+1), CDVT(0+1);
   a Sustainable Cell Rate for the aggregate traffic SCR (0+1);
   a Burst Tolerance for the aggregate traffic BT(0+1);
method comprising the successive steps of:
   policing the traffic by means of a first Generic Cell Rate Algorithm (GCRA) according to PCR(0+1) and CDVT(0+1);
   policing the traffic by means of a second Generic Cell Rate Algorithm (GCRA) according to PCR(0+1) and $CDVT_{ref}$(0+1) with tagging; and
   policing the traffic by means of a third Generic Cell Rate Algorithm (GCRA) according to PCR(0) and the minimum value of CDVT(0) and $CDVT_{ref}$(0), or SCR(0), BT(0) or SCR(0+1), BT(0+1) depending on the declared traffic descriptor.

4. The method according to claim 2 wherein said method comprises the successive steps of:
   policing the traffic by means of a first Generic Cell Rate Algorithm (GCRA) according to PCR(0+1) and CDVT (0+1);
   policing the traffic by means of a second Generic Cell Rate Algorithm (GCRA) according to either:
      for the first traffic descriptor, PCR(0+1), CDVT sub ref (0+1), with tagging;
      or for the second traffic descriptor, PCR(0) and the minimum value of CDVT(0) and $CDVT_{ref}$(0), with tagging if $CDVT_{ref}$(0) is less than CDVT(0);
      or for the third traffic descriptor, PCR(0) and the minimum value of CDVT(0) and $CDVT_{ref}$(0), with tagging;
      or for the fourth traffic descriptor:
         if BT(0) is less than a predefined Burst Tolerance bound value for high priority traffic $BT_{bound}$(0) SCR(0) and BT(0);
         otherwise, a computed modified Sustainable Cell Rate value SCR prime (0) and a reference Burst Tolerance value $BT_{ref}$(0), with tagging;
      or for the fifth traffic descriptor:
         if BT(0) is less than $BT_{bound}$(0) SCR(0) and BT(0) with tagging;
         otherwise, a computed modified Sustainable Cell Rate value SCR' (0) and $BT_{ref}$(0), with tagging;
      or for the sixth traffic descriptor:
         if BT(0+1) is less than $BT_{bound}$(0+1), SCR(0+1) and BT(0+1);
         otherwise, a computed modified Sustainable Cell Rate value SCR' (0+1) and $BT_{ref}$ (0+1), with tagging.

5. The method according to claim 4 wherein, the modified Sustainable Cell Rate is computed according to the following expression:

$$SCR' = \frac{1}{T + \frac{BT_{ref}}{Int\left[1 + \frac{BT}{(T_s - T)}\right]}}$$

where:

$-T = 1/PCR$ $-T_s = 1/SCR.$

6. The method according to claim 3 for a Variable Bit Rate (VBR) connection for which the Burst Tolerance (BT) is less than the Burst Tolerance bound value ($BT_{bound}$), wherein the amount of bandwidth reserved is an increasing function of a Mean Burst Duration (B), said Mean Burst Duration being an increasing function of a Burst Tolerance (BT) declared at connection setup.

7. The method according to claim 6 wherein the amount of bandwidth reserved is equal to:

$$\hat{c} = PCR \frac{y - x + \sqrt{[y - x]^2 + 4x\rho y}}{2y}$$

where:
   $y = \alpha B (1-\rho) PCR$,
   $\rho = SCR/PCR$,
   SCR is a declared Sustainable Cell Rate,
   PCR is a declared Peak Cell Rate,
   $\alpha = \ln(1/\epsilon)$
   x is an amount of buffer space available in a network node,
   $\epsilon$ is a desired buffer overflow probability.

8. The method according to claim 7 wherein the traffic burst duration is distributed according to a probability law, in particular a negative exponential function for which a Mean Burst Duration is defined as equal to:

$$B = \frac{BT}{\ln(1/Q)}$$

where:
   Q is the probability to have a burst duration greater than the Burst Tolerance (BT).

9. The method according to claim 1 wherein, at least one of the following values:
   the Cell Delay Variation Tolerance bound value ($CDVT_{bound}$),
   the Cell Delay Variation Tolerance reference value ($CDVT_{ref}$), is equal to a Cell Delay Variation Tolerance maximum value:

$$\frac{CDVT_{max}}{d} = \max\left[\frac{T}{D}, \alpha\left(1 - \frac{d}{T}\right)\right]$$

where:
   d is a slot duration
   $\alpha$ is a constant.

10. The method according to claim 4 wherein, at least one of the following values:
   the Burst Tolerance bound value ($BT_{bound}$)
   the Burst Tolerance reference value ($BT_{ref}$), is equal to a Burst Tolerance maximum value defined as:

$$\frac{BT_{max}}{T} = \max\left[\frac{T_s}{T}, \alpha\left(1 - \frac{T}{T_s}\right)\right]$$

where:
   $\alpha$ is a constant.

11. The method according to claim 1 wherein, for a Variable Bit Rate (VBR) connection, if the declared Cell Delay Variation Tolerance (CDVT) is less or equal to the Cell Delay Variation Tolerance bound value ($CDVT_{bound}$) the amount of bandwidth reserved is an increasing function of a Mean Burst Duration (B), said Mean Burst Duration being an increasing function of a Burst Tolerance (BT) declared at connection setup.

12. The method according to claim 11 wherein the amount of bandwidth reserved is equal to:

$$\hat{c} = PCR \frac{y - x + \sqrt{[y-x]^2 + 4x\rho y}}{2y}$$

where:

$y = \alpha B (1-\rho) PCR$, $\rho = SCR/PCR$,

SCR is a declared Sustainable Cell Rate,

PCR is a declared Peak Cell Rate, $\alpha = \ln(1/\epsilon)$ x is an amount of buffer space available in a network node, $\epsilon$ is a desired buffer overflow probability.

13. The method according to claim 12 wherein the traffic burst duration is distributed according to a probability law, in particular a negative exponential function for which a Mean Burst Duration is defined as equal to:

$$B = \frac{BT}{\ln(1/Q)}$$

where:

Q is the probability to have a burst duration greater than the Burst Tolerance (BT).

14. In a cell switching network comprising a plurality of access and transit nodes interconnected with transmission links, an access node for reserving bandwidth for very bursty traffic according to a connection specified quality of service, and for policing said traffic according to traffic parameters and tolerance values declared at connection setup, comprising:

means for determining a Cell Delay Variation Tolerance bound value ($CDVT_{bound}$), means for reserving bandwidth in order to satisfy the specified quality of service if a declared Cell Delay Variation Tolerance (CDVT) value is less than or equal to the Cell Delay Variation Tolerance bound value ($CDVT_{bound}$), and means for reserving bandwidth and policing traffic in order to satisfy a quality of service based on new defined traffic parameters and tolerance values if the declared Cell Delay Variation Tolerance (CDVT) value is greater than the Cell Delay Variation Tolerance bound value ($CDVT_{bound}$).

15. In a cell switching network comprising a plurality of access and transit nodes interconnected with transmission links, a method for reserving bandwidth in an access node for very bursty traffic according to a connection specified quality of service, and for policing said traffic according to traffic parameters and tolerance values declared at connection setup, comprising the steps of:

determining a Cell Delay Variation Tolerance bound value ($CDVT_{bound}$), reserving bandwidth in order to satisfy the specified quality of service if a declared Cell Delay Variation Tolerance (CDVT) value is less than or equal to the Cell Delay Variation Tolerance bound value ($CDVT_{bound}$), and reserving bandwidth and policing traffic in order to satisfy a quality of service based on new defined traffic parameters and tolerance values if the declared Cell Delay Variation Tolerance (CDVT) value is greater than the Cell Delay Variation Tolerance bound value ($CDVT_{bound}$).

16. An article of manufacturing for a computer usable medium having computer readable program code means embodied therein for reserving bandwidth in an access node for very bursty traffic according to a connection specified quality of service, and for policing said traffic according to traffic parameters and tolerance values declared at connection setup in a cell switching network comprising a plurality of access and transit nodes interconnected with transmission links, the computer readable program code means in said article of manufacturing comprising:

computer readable program code means for determining and declaring a Cell Delay Variation Tolerance bound value ($CDVT_{bound}$);

computer readable program code means for reserving bandwidth in order to satisfy the specified quality of service if a declared Cell Delay Variation Tolerance (CDVT) value is less than or equal to the Cell Delay Variation Tolerance bound value ($CDVT_{bound}$), and computer readable program code means for reserving bandwidth and policing traffic in order to satisfy a quality of service based on new defined traffic parameters and tolerance values if the declared Cell Delay Variation Tolerance (CDVT) value is greater than the Cell Delay Variation Tolerance bound value ($CDVT_{bound}$).

* * * * *